US008787568B2

(12) United States Patent
Shibutani et al.

(10) Patent No.: US 8,787,568 B2
(45) Date of Patent: Jul. 22, 2014

(54) DATA TRANSFORMATION APPARATUS, DATA TRANSFORMATION METHOD, AND COMPUTER PROGRAM

(75) Inventors: Kyoji Shibutani, Kanagawa (JP); Taizo Shirai, Kanagawa (JP); Toru Akishita, Tokyo (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 12/439,302

(22) PCT Filed: Aug. 29, 2007

(86) PCT No.: PCT/JP2007/066732
§ 371 (c)(1),
(2), (4) Date: Feb. 27, 2009

(87) PCT Pub. No.: WO2008/026624
PCT Pub. Date: Mar. 6, 2008

(65) Prior Publication Data
US 2010/0002872 A1 Jan. 7, 2010

(30) Foreign Application Priority Data

Sep. 1, 2006 (JP) ................................. 2006-238227

(51) Int. Cl.
*G06F 21/00* (2013.01)
*H04L 29/06* (2006.01)

(52) U.S. Cl.
USPC .......................................................... 380/42

(58) Field of Classification Search
None
See application file for complete search history.

(56) References Cited

U.S. PATENT DOCUMENTS

| 6,769,063 | B1 * | 7/2004 | Kanda et al. ................... 713/193 |
| 2001/0024502 | A1 * | 9/2001 | Ohkuma et al. ................ 380/46 |
| 2003/0059044 | A1 * | 3/2003 | Shimizu et al. ................ 380/37 |
| 2004/0247117 | A1 | 12/2004 | Vaudenay et al. |
| 2005/0111659 | A1 * | 5/2005 | Shirai et al. .................... 380/37 |

FOREIGN PATENT DOCUMENTS

| CN | 1312630 A | 9/2001 |
| CN | 1808526 A | 7/2006 |
| JP | 05-095350 | 4/1993 |
| JP | 2001-324924 | 11/2001 |
| JP | 2006-72054 | 3/2006 |

(Continued)

OTHER PUBLICATIONS

Kaisa Nyberg, "Generalized Feistel Networks", pp. 91-104, Finnish Defence Forces, CIS Division, Helsinki, Finland.

(Continued)

*Primary Examiner* — Izunna Okeke
(74) *Attorney, Agent, or Firm* — Finnegan, Henderson, Farabow, Garrett & Dunner, L.L.P.

(57) ABSTRACT

A non-linear transformation processing structure having a high implementation efficiency and a high security is realized. Data transformation is performed using a first non-linear transformation part performing non-linear transformation using a plurality of small S-boxes; a linear transformation part receiving all the outputs from the first non-linear transformation part and performing data transformation using a matrix for performing optimal diffusion mappings; and a second non-linear transformation part including a plurality of small non-linear transformation parts that perform non-linear transformation on individual data units into which output data from the linear transformation part is divided. With this structure, appropriate data diffusion can be achieved without excessively increasing a critical path, and a structure with a high implementation efficiency and a high security can be achieved.

8 Claims, 19 Drawing Sheets

(56) References Cited

FOREIGN PATENT DOCUMENTS

| JP | 2007-527028 | 9/2007 |
|----|----|----|
| WO | WO 01-67425 | 9/2001 |
| WO | WO 01/67425 A1 | 9/2001 |

OTHER PUBLICATIONS

Yuliang Zheng et al., "On the Construction of Block Ciphers Provably Secure and Not Relynig on Any Unproved Hypotheses". pp. 461-480, Division of Electrical and Computer Engineering, Yokohama National University, Yokohama, Japan.

Lim, C. H., "A Revised Version of CRYPTON—CRYPTON V1.0", Lecture Notes in Computer Science, Fast Software Encryption, 6th International Workshop. FSE '99, Rome, Italy, Mar. 1999, 16 pages.

Coding Technique Evaluation Report CRYPTEC Report 2000, Mar. 2001, Information Processing Progression Project Society Security Center, 4 pages.

Document with regard to Selection/Design/Evaluation of Common Key Block Code, Research Development Project with regard to Communication Broadcast Mechanism Information Security Technique, Jun. 2000, 4 pages.

Communication from the Japanese Patent Office regarding JP Application No. 2006-238227, dated Apr. 16, 2013, 11 pages.

Notification of Reasons for Refusal with English language translation issued by Japanese Patent Office on Dec. 13, 2011 in corresponding Japanese application No. 2006-238227.

Office Action from Japanese Patent Office for Japanese Patent Application No. 2006-238227 dated May 29, 2012, 2 pages.

Office Action from Chinese Patent Office for Chinese Patent Application No. 201210050602.9 dated Mar. 31, 2014, 9 pages.

\* cited by examiner (b)

| x | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| $S4_0(x)$ | E | 6 | C | A | 8 | 7 | 2 | F | B | 1 | 4 | 0 | 5 | 9 | D | 3 |
| $S4_1(x)$ | 6 | 4 | 0 | D | 2 | B | A | 3 | 9 | C | E | F | 8 | 7 | 5 | 1 |
| $S4_2(x)$ | B | 8 | 5 | E | A | 6 | 4 | C | F | 7 | 2 | 3 | 1 | 0 | D | 9 |
| $S4_3(x)$ | A | 2 | 6 | D | 3 | 4 | 5 | E | 0 | 7 | 8 | 9 | B | F | C | 1 |

DATA TRANSFORMATION APPARATUS, DATA TRANSFORMATION METHOD, AND COMPUTER PROGRAM

TECHNICAL FIELD

The present invention relates to data transformation apparatuses, data transformation methods, and computer programs. More specifically, the present invention relates to a data transformation apparatus, a data transformation method, and a computer program for performing non-linear transformation processing that is applicable, for example, to common-key blockcipher processing, hash function, or the like.

BACKGROUND ART

With the recent development of network communications and electronic transactions, maintenance of security in communications has become a critical issue. One method of maintaining security is cryptography. Currently, communications using various cryptographic techniques are actually performed.

For example, systems have been put into practical use in which an encryption processing module is embedded in a compact device such as an IC card and data transmission and reception is performed between the IC card and a reader/writer serving as a data read/write device so that authentication processing or encryption and decryption of transmission/reception data is performed.

There are various cryptographic algorithms. According to a rough classification, the cryptographic algorithms are classified into public-key cryptography in which an encryption key and a decryption key are set as different keys, such as, for example, a public key and a secret key, and common-key cryptography in which an encryption key and a decryption key are set as a common key.

There are various algorithms in common-key cryptography. One of such algorithms is a cryptography in which a plurality of keys are generated on the basis of a common key and data transformation processing is repeatedly performed in units of blocks (64 bits, 128 bits, etc.) by using the generated plurality of keys. A typical algorithm using the key generation method and the data transformation processing is common-key blockcipher cryptography.

As typical common-key blockcipher algorithms, for example, the DES (Data Encryption Standard) algorithm, which was the U.S. standard cryptography, the AES (Advanced Encryption Standard) algorithm, which is the current U.S. standard cryptography, and the like are known.

Such a common-key blockcipher algorithm is mainly constituted by an encryption processing part including round-function executing parts that repeatedly perform transformation of input data, and a key scheduling part generating a round key used for each of the rounds of the round-function parts. The key scheduling part first generates an expanded key with an increased number of bits on the basis of a master key (primary key), which is a secret key, and generates a round key (sub-key) used for each of the round-function parts of the encryption processing part on the basis of the generated expanded key.

As a specific structure for implementing such an algorithm, a structure in which a round function including a linear transformation part and a non-linear transformation part is iterated is known. For example, a typical structure is a Feistel structure. The Feistel structure is a structure in which plaintext is transformed into ciphertext by simple iterations of round functions (F-functions) serving as data transformation functions. In the round functions (F-functions), linear transformation processing and non-linear transformation processing are performed. Note that as documents describing cipher processing using the Feistel structure, for example, non-patent document 1 and non-patent document 2 are available.

In the common-key blockcipher processing or, for example, hash function, data transformation based on non-linear transformation processing is performed. Non-linear transformation functions called S-boxes can be used in non-linear transformation. The S-boxes are elements of a blockcipher or a hash function, and are very important functions for determining its security or performance of implementation. The S-boxes are generally non-linear transformation functions with n-bit input and m-bit output. S-boxes with the same number of input and output bits and an input-output relation of one-to-one correspondence are referred to as bijective S-boxes.

In a case where S-boxes are used for the non-linear transformation of the encryption processing, properties of the applied S-boxes greatly affect the encryption security. That is, various cryptanalytic attacks such as, for example, differential attacks and linear attacks, are known. The higher the difficulty of key or algorithm analysis by such cryptanalytic attacks, the higher the security. The security largely depends on the properties of S-boxes used in a blockcipher or a hash function.

For example, it is generally difficult to strictly evaluate the security of the overall cryptographic algorithm or round functions applied to cipher processing because the input and output size is large (for example, 64 bits, 128 bits, etc.). However, the input and output size of S-boxes is generally small, for example, about 8-bit input and output, and a strict security evaluation can be achieved. The fact that in order to improve the security of the overall cryptographic algorithm, at least the characteristics listed below are required for S-boxes is known.

(1) The maximum differential probability is sufficiently small.
(2) The maximum linear probability is sufficiently small.
(3) The order of a Boolean algebra represented by a Boolean polynomial is sufficiently high.
(4) The number of terms in the polynomial representation of the input and output is sufficiently large.

Mainly, the characteristic (1) determines the resistance to the differential attacks, the characteristic (2) determines the resistance to the linear attacks, the characteristic (3) determines the resistance to higher order differential attacks, and the characteristic (4) determines the resistance to interpolation attacks. Furthermore, in order to improve the security, it is important to have a low correlation between input and output bits of S-boxes, to have a change rate in the output of about ½ with respect to one-bit change in the input, etc.

Also, in addition to the requirement for high security, high performance of implementations is also required for S-boxes. For example, in an implementation structure in which software-based cipher processing or hash function is performed, a structure in which generally, a table indicating an output with respect to an input is stored in a memory and non-linear transformation processing is performed using a technique called table lookup (table implementation) is implemented. Thus, the implementation performance does not greatly depend on the internal structure of the S-boxes. However, in hardware-based implementations, a circuit to calculate a specific output on the basis of, for example, an input value is configured. This circuit configuration largely depends on the applied S-boxes, and the size of the circuit is also affected by the S-boxes.

Non-Patent Document 1: K. Nyberg, "Generalized Feistel networks", ASIACRYPT '96, Springer Verlag, 1996, pp. 91-104.

Non-patent Document 2: Yuliang Zheng, Tsutomu Matsumoto, Hideki Imai On the Construction of Block Ciphers Provably Secure and Not Relying on Any Unproved Hypotheses. CRYPTO 1989: 461-480.

DISCLOSURE OF INVENTION

Technical Problem

The present invention has been designed in view of the above-described problems. An object of the present invention is to provide a data transformation apparatus, a data transformation method, and a computer program in which the structure of S-boxes for performing non-linear transformation processing used in cipher processing, hash function, or the like is improved, the data transformation apparatus, the data transformation method, and the computer program having a configuration in which resistance to various cryptanalytic attacks is increased, that is, having an improved security.

Technical Solution

According to a first aspect of the present invention, a data transformation apparatus is characterized by including a first non-linear transformation part constituted by a plurality of small non-linear transformation parts performing non-linear transformation processing on individual divided data units into which input data is divided;

a linear transformation part that receives all the outputs from the plurality of small non-linear transformation parts constituting the first non-linear transformation part and that performs linear transformation; and a second non-linear transformation part constituted by a plurality of small non-linear transformation parts performing non-linear transformation processing on individual divided data units into which output data from the linear transformation part is divided, wherein the linear transformation part is configured to perform data transformation using an operation of a matrix having elements whose size is equal to the bit size of the input data, and when the matrix is an m×m matrix, is configured to perform data transformation processing using a highly branched matrix having a number of branches at least not less than m.

In addition, an embodiment of the data transformation apparatus according to the present invention is characterized in that when the input data is n-bit data, the first non-linear transformation part is constituted by k small non-linear transformation parts each receiving n/k bits, which form divided data units into which the n-bit input data is divided, and outputting n/k bits as a non-linear transformation processing result; the linear transformation part is configured to receive data of a total of n bits output from the k small non-linear transformation parts and to generate an n-bit output by the data transformation processing using the highly branched matrix; and the second non-linear transformation part is configured to include k small non-linear transformation parts each receiving n/k bits, which form divided data units into which the n-bit data output from the linear transformation part is divided, and outputting n/k bits as a non-linear transformation processing result.

In addition, an embodiment of the data transformation apparatus according to the present invention is characterized in that the linear transformation part is configured to perform data transformation processing using an MDS (Maximum Distance Separable) matrix for performing optimal diffusion mappings (ODM (Optimal Diffusion Mappings)) processing.

In addition, an embodiment of the data transformation apparatus according to the present invention is characterized in that the linear transformation part is configured to, when the input data is n-bit data, perform data transformation processing using a matrix over an extension field $GF(2^n)$ defined by an nth-order irreducible polynomial $p(x)$ defined over $GF(2)$.

In addition, an embodiment of the data transformation apparatus according to the present invention is characterized in that the data transformation apparatus is an S-box performing non-linear transformation processing of n-bit input and output, and the plurality of small non-linear transformation parts included in the first non-linear transformation part and the second non-linear transformation part include a small S-box having a number of bits smaller than n bits and performing non-linear transformation processing.

In addition, an embodiment of the data transformation apparatus according to the present invention is characterized in that the data transformation apparatus is configured to perform encryption processing including non-linear transformation processing.

In addition, an embodiment of the data transformation apparatus according to the present invention is characterized in that the encryption processing includes common-key blockcipher processing.

In addition, according to a second aspect of the present invention, a data transformation method performed in a data transformation apparatus is characterized by including a first non-linear transformation step of performing, in a first non-linear transformation part, non-linear transformation processing on individual divided data units into which input data is divided, by using a plurality of small non-linear transformation parts;

a linear transformation step of receiving, in a linear transformation part, all the outputs from the plurality of small non-linear transformation parts constituting the first non-linear transformation part, and performing linear transformation; and a second non-linear transformation step of performing, in a second non-linear transformation part, non-linear transformation processing on individual divided data units into which output data from the linear transformation part is divided, by using a plurality of small non-linear transformation parts, wherein the linear transformation step is configured to perform data transformation using an operation of a matrix having elements whose size is equal to the bit size of the input data, and when the matrix is an m×m matrix, is a step of performing data transformation processing using a highly branched matrix having a number of branches at least not less than m.

In addition, according to a third aspect of the present invention, a computer program for causing a data transformation apparatus to perform data transformation processing is characterized by including a first non-linear transformation step of causing, in a first non-linear transformation part, non-linear transformation processing to be performed on individual divided data units into which input data is divided, by using a plurality of small non-linear transformation parts;

a linear transformation step of receiving, in a linear transformation part, all the outputs from the plurality of small non-linear transformation parts constituting the first non-linear transformation part, and causing linear transformation to be performed; and a second non-linear transformation step of causing, in a second non-linear transformation part, non-linear transformation processing to be performed on individual divided data units into which output data from the linear transformation part is divided, by using a plurality of small non-linear transformation parts, wherein the linear transformation step is configured to perform data transformation using an operation of a matrix having elements whose size is equal to the bit size of the input data, and when the matrix is an m×m matrix, is a step of causing data transformation processing using a highly branched matrix having a number of branches at least not less than m to be performed.

Note that the computer program according to the present invention is, for example, a computer program that can be provided for a computer system capable of executing various types of program code in the form of a computer-readable storage medium, a communication medium, a recording medium, such as, for example, a CD, an FD, or an MO, or a communication medium such as a network. Such a program is provided in the computer-readable form, thereby implementing processing in accordance with the program on the computer system.

Further objects, features, and advantages of the present invention will become apparent from the following detailed description based on embodiments of the present invention and the accompanying drawings. Note that the system referred to in this specification represents a structure of a logical set of a plurality of apparatuses, and the apparatuses having individual configurations are not necessarily contained in a single housing.

Advantageous Effects

According to the structure of an embodiment of the present invention, non-linear transformation processing performed in processing such as, for example, common-key blockcipher processing or hash function is configured such that data transformation is performed using a first non-linear transformation part performing non-linear transformation using a plurality of small S-boxes; a linear transformation part receiving all the outputs from the first non-linear transformation part, and performing linear transformation; and a second non-linear transformation part constituted by a plurality of small non-linear transformation parts performing non-linear transformation processing on individual divided data units into which output data from the linear transformation part is divided. The linear transformation part is configured to perform data transformation using a matrix for performing optimal diffusion mappings. Thus, appropriate data diffusion can be achieved without excessively increasing a critical path extending from the data input to the output, and high-security data transformation with high resistance to various cryptanalytic attacks can be achieved.

BEST MODES FOR CARRYING OUT THE INVENTION

Hereinafter, a data transformation apparatus, a data transformation method, and a computer program according to the present invention will be described. The description will be provided in accordance with the following items:

1. Overview of common-key blockciphers
2. Overview of cryptanalytic attacks
3. Structure of non-linear transformation processing based on combination of a plurality of small S-boxes
(3-1) With regard to effectiveness of structure of non-linear transformation processing based on combination of a plurality of small S-boxes
(3-2) Structure of non-linear transformation processing based on combination of a plurality of small S-boxes of conventional type and problems therewith (3-3) Structure of non-linear transformation processing based on combination of a plurality of small S-boxes according to the present invention
4. Structural example of encryption processing apparatus

[1. Overview of Common-Key Blockciphers]

First, the overview of common-key blockciphers to which the present invention is applicable will be described. In this specification, a common-key blockcipher (hereinafter, a blockcipher) refers to a cipher defined below.

A blockcipher receives plaintext P and a key K and outputs ciphertext C. The bit length of plaintext and ciphertext is called a block size, and is represented by n here. Although n can be any integer value, n is generally a value uniquely determined in advance for each blockcipher algorithm. A blockcipher with a block length of n may be called an n-bit blockcipher.

The bit length of a key is represented by k. The key can have any integer value. A common-key blockcipher algorithm supports one or a plurality of key sizes. For example, a blockcipher algorithm A with a block size n=128 may be configured so as to support various key sizes of bit lengths k=128, k=192, and k=256.

The bit sizes of the individual plaintext [P], ciphertext [C], and key [K] are represented as follows.

Plaintext P: n bits
Ciphertext C: n bits
Key K: k bits

Figure 1:
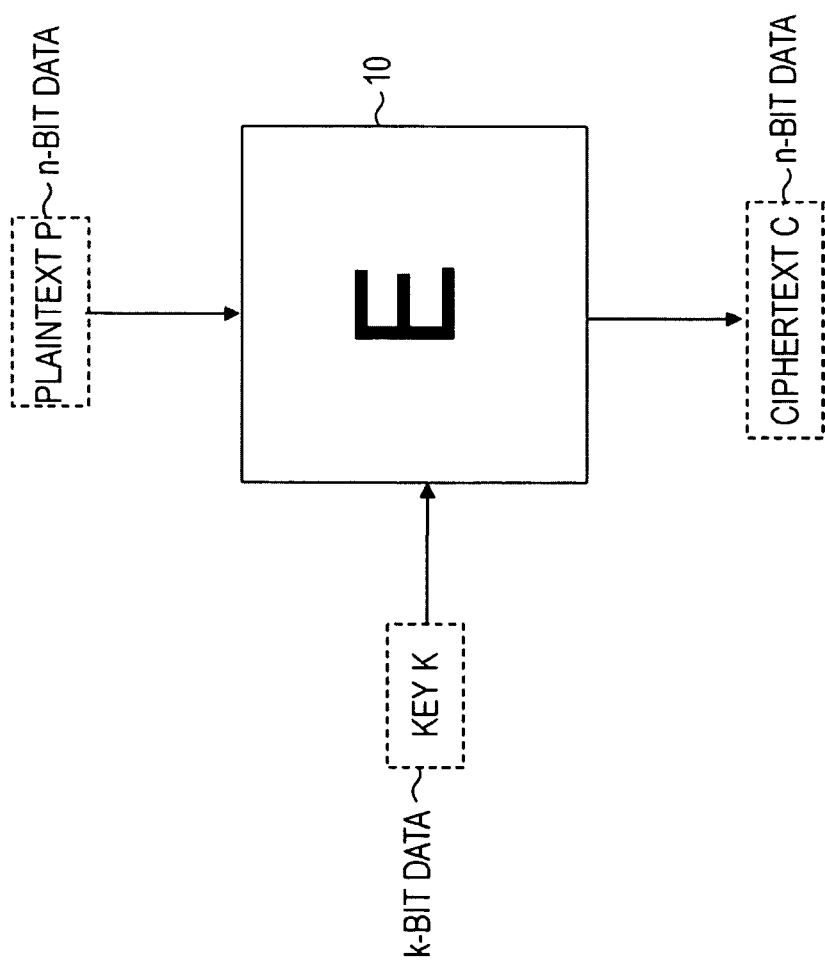
FIG. 1 is an illustration showing the basic configuration of a common-key blockcipher algorithm.

FIG. 1 shows an illustration of an n-bit common-key blockcipher algorithm E that supports a key length of k bits. As shown in FIG. 1, a common-key blockcipher processing part E 10 receives n-bit plaintext P and a k-bit key K, performs a predetermined encryption algorithm, and outputs n-bit ciphertext C. Note that in FIG. 1, only encryption processing for generating ciphertext from plaintext is illustrated. Decryption processing for generating plaintext from ciphertext generally uses a function inverse to that for the cipher processing part E 10. However, depending on the structure of the cipher processing part E 10, a similar common-key blockcipher processing part E 10 may also be used for the decryption processing. The decryption processing can be performed by changing a sequence such as a key input order.

Figure 2:
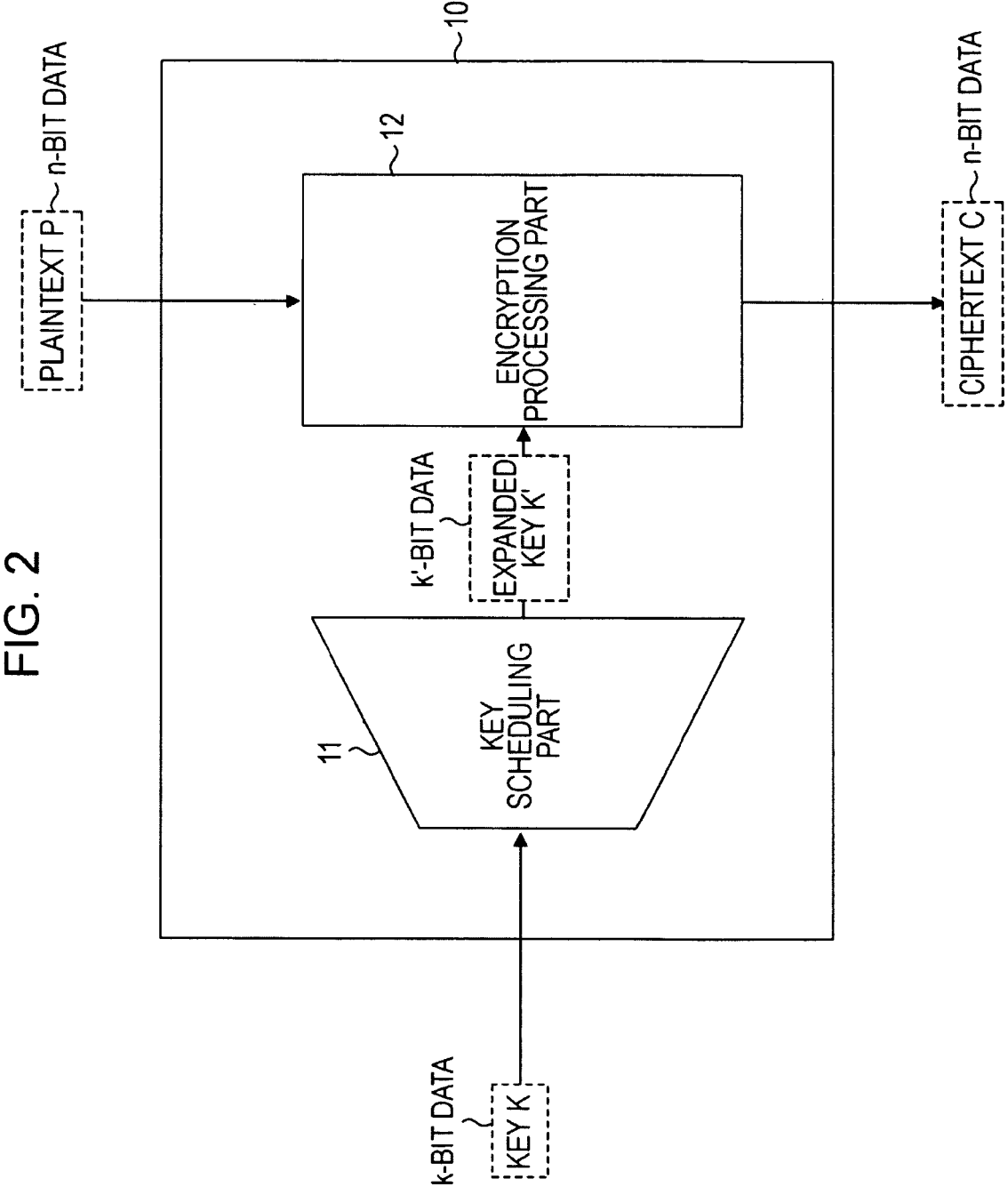
FIG. 2 is an illustration for explaining the internal structure of a common-key blockcipher processing part E 10 shown in FIG. 1.

The internal structure of the common-key blockcipher processing part E 10 shown in FIG. 1 will be described with reference to FIG. 2. The blockcipher can be considered as two divided parts. One of the parts is a key scheduling part 11 that receives the key K, increases the bit length of the input key K in a predetermined step, and outputs an expanded key K' (with a bit length k'). The other of the parts is an encryption processing part 12 that receives the plaintext P and the expanded key K' input from the key scheduling part 11, performs encryption processing using the expanded key K' by inputting the plaintext P, and performs data transformation for generating the ciphertext C. Note that as described above, depending on the structure of the encryption processing part 12, the encryption processing part 12 may also be used for the data decryption processing for recovering plaintext from ciphertext.

Figure 3:
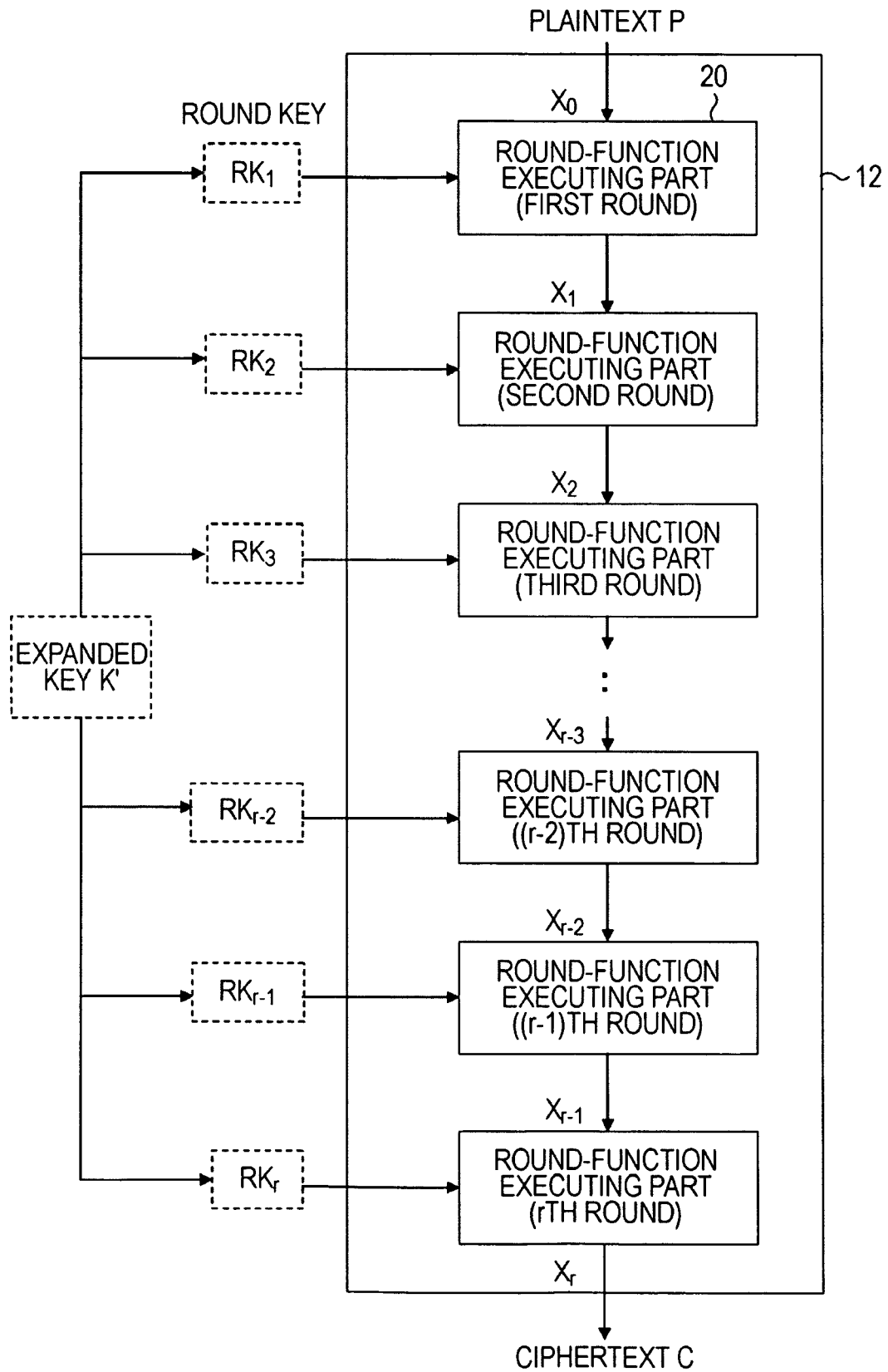
FIG. 3 is an illustration for explaining the detailed structure of an encryption processing part 12 shown in FIG. 2.

Next, the detailed structure of the encryption processing part 12 shown in FIG. 2 will be described with reference to FIG. 3. As shown in FIG. 3, the encryption processing part 12 has a configuration to repeatedly perform data transformation using round-function executing parts 20. That is, the encryption processing part 12 can be divided into processing units called the round-function executing parts 20. The round-function executing parts 20 receive two types of data, an output $X_i$ of the previous round-function executing part and a round key $RK_i$ generated on the basis of an expanded key, performs internal data transformation processing, and outputs output data $X_{i+1}$ to the next round-function executing part. Note that in the first round, input is plaintext or initialization data corresponding to plaintext. In addition, output in the final round is ciphertext.

In the example shown in FIG. 3, the encryption processing part 12 includes r round-function executing parts 20 and is configured to repeat data transformation r times in the round-function executing parts to generate ciphertext. The number of repetitions of the round functions is referred to as the number of rounds. In the example shown the figure, the number of rounds is r.

Data $X_i$ input to each of the round-function executing parts is n-bit data in the process of encryption, and a round function output $X_{i+1}$ for a given round is supplied as input for the next round. As the other data input to each of the round-function executing parts, data based on the expanded key K' output from the key scheduling is used. The key input to each of the round-function executing parts and used for implementation of the round function is referred to as a round key. In the figure, a round key used in the ith round is represented as $RK_i$. The expanded key K' is configured, for example, as concatenated data sets of the round keys $RK_1$ to $RK_r$ for r rounds.

The structure shown in FIG. 3 is the structure of the encryption processing part 12, in which, as viewed from the input of the encryption processing part 12, input data for the first round is represented by $X_0$, data output from the ith round function is represented by $X_i$, and a round key is represented by $RK_i$. Note that depending on the structure of the encryption processing part 12, the encryption processing part 12 may be configured such that decrypted text can be output by, for example, setting an applied sequence of applied round keys reversely to that in the encryption processing and inputting ciphertext to the encryption processing part 12.

Figure 4:
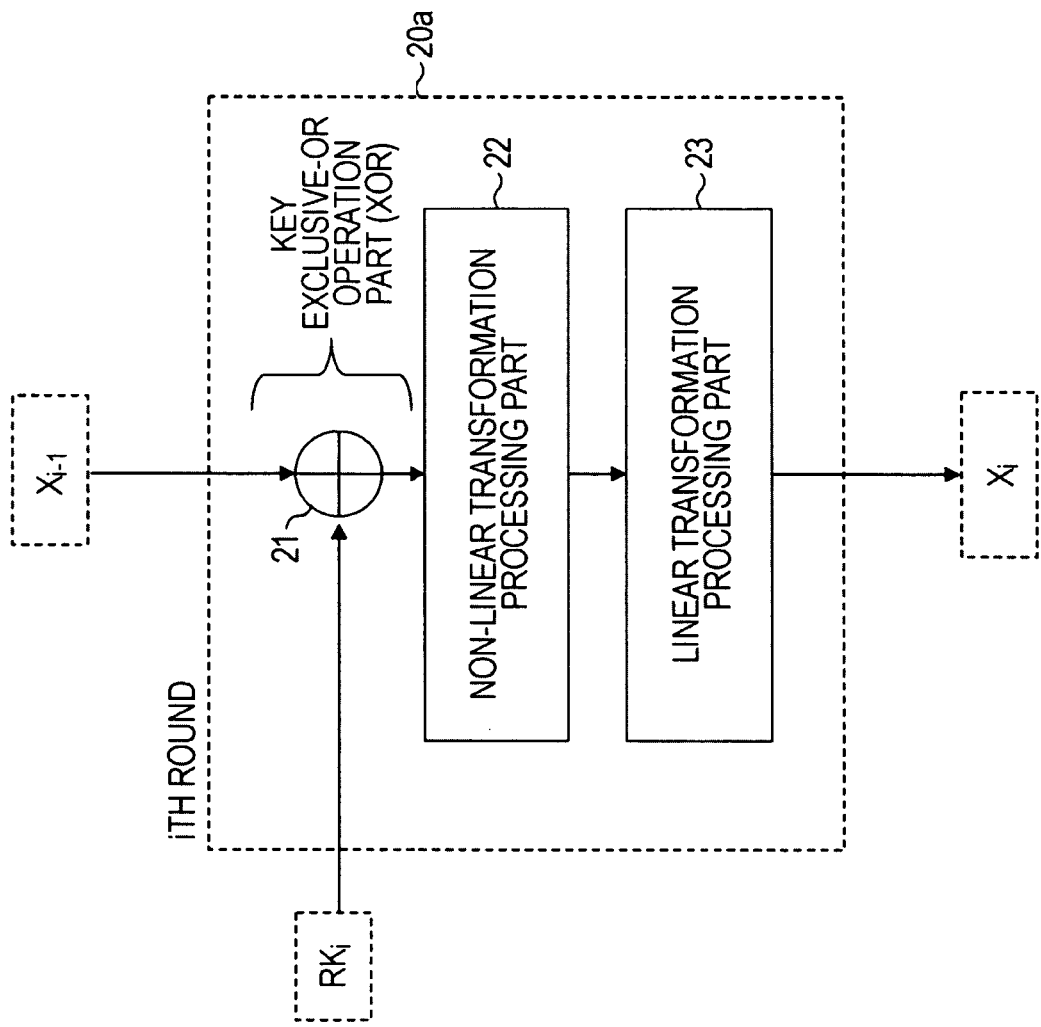
FIG. 4 is an illustration for explaining an SPN-structure round function, which is an example of the structure of a round-function executing part.
Figure 5:
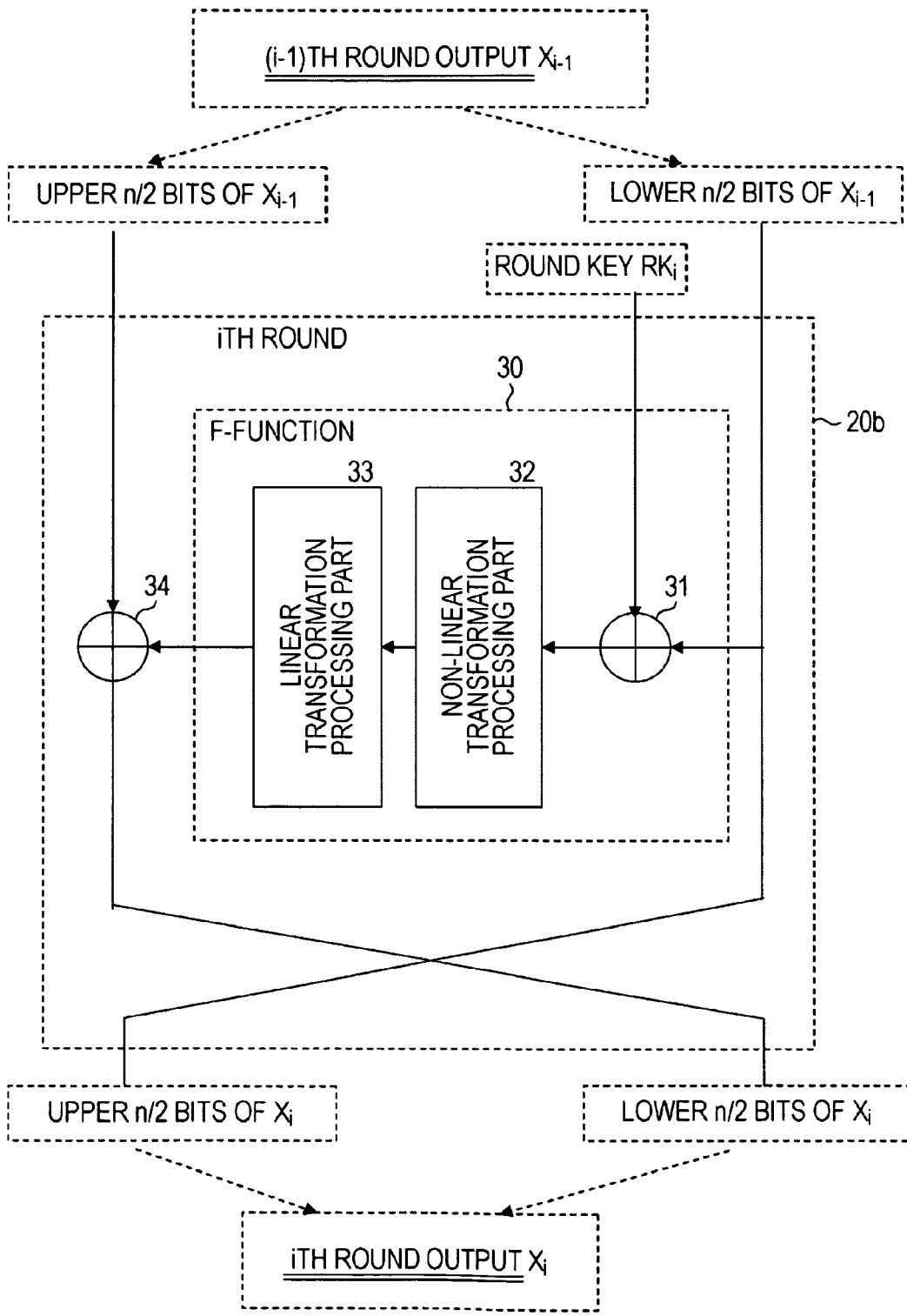
FIG. 5 is an illustration for explaining a Feistel structure, which is an example of the structure of the round-function executing part.

The round-function executing parts 20 of the encryption processing part 12 shown in FIG. 3 can have various forms. Round functions are classified according to the structure adopted in the encryption algorithm. As typical structures, the following structures are available:

(a) SPN (Substitution Permutation Network) structure
(b) Feistel structure
(c) Extended Feistel structure Hereinafter, these structures will be described specifically with reference to FIGS. 4 to 6.

(a) SPN-Structure Round Functions

First, an SPN-structure round function, which is an example of the structure of the round-function executing parts 20, will be described with reference to FIG. 4. An SPN-structure round-function executing part 20a has a so-called SP-type structure in which a non-linear transformation layer (S-layer) and a linear transformation layer (P-layer) are connected. As shown in FIG. 4, the SPN-structure round-function executing part 20a is constituted by an exclusive-OR operation part 21 that performs an exclusive-OR (XOR) operation between all the n-bit input data and round keys, a non-linear transformation processing part 22 that receives the operation results of the exclusive-OR operation part 21 and performs non-linear transformation on the input data, a linear transformation processing part 23 that receives the result of non-linear transformation processing performed by the non-linear transformation processing part 22 and performs linear transformation processing on the input data, and the like. The result of linear transformation processing performed by the linear transformation processing part 23 is output to the next round. In the final round, ciphertext is output. Note that in the example shown in FIG. 4, the processing order of the exclusive-OR operation part 21, the non-linear transformation processing part 22, and the linear transformation processing part 23 is illustrated. However, the order of these processing parts is not limited, and a configuration in which the processing is performed using any other sequence is also possible.

(b) Feistel Structure

Next, the Feistel structure, which is another example of the structure of the round-function executing parts 20, will be described with reference to FIG. 5. In the Feistel structure, as shown in FIG. 5, n-bit input data input from the previous round (in the first round, input text) is divided into two n/2-bit data units, and processing is performed with permutation of the two n/2-bit data units in each round.

In the processing using a round-function executing part 20b with the Feistel structure, as shown in the figure, one n/2-bit data unit and a round key are input to an F-function part 30. As with the SPN structure described above, the F-function part 30 has a so-called SP-type structure in which a non-linear transformation layer (S-layer) and a linear transformation layer (P-layer) are connected.

The one n/2-bit data unit and the round key from the previous round are input to an exclusive-OR operation part 31 in the F-function part 30 and exclusive-OR (XOR) processing is performed. Furthermore, the resulting data is input to a non-linear transformation processing part 32 and non-linear transformation is performed. Furthermore, the result of non-linear transformation is input to a linear transformation processing part 33 and linear transformation is performed. The result of linear transformation is output as F-function processing result data.

Furthermore, the F-function output and the other n/2-bit data unit input from the previous round are input to an exclusive-OR operation part 34 and an exclusive-OR (XOR) operation is performed. The result obtained by performing the exclusive-OR operation is set as F-function input for the next round. Note that n/2 bits set as F-function input for the ith round shown in the figure are used for an exclusive-OR operation with F-function output in the next round. As described above, in the Feistel structure, data transformation processing is performed using F-functions with alternate permutation of inputs in each round.

(c) Extended Feistel Structure

Next, the extended Feistel structure, which is another example of the structure of the round-function executing parts 20, will be described with reference to FIG. 6. In the Feistel structure described above with reference to FIG. 5, n-bit plaintext is divided into two units, and processing is performed in units of n/2 bits. That is, the processing is performed with the number of divisions: d=2. The number of divisions is also referred to as the number of data lines.

In the extended Feistel structure, the number d of data lines (the number of divisions) is set to any integer of three or more. A variety of extended Feistel structures can be defined according to the value of the number d of data lines (the number of divisions). In the example shown in FIG. 6, the number d of data lines (the number of divisions) is 4, and n/4-bit data is input to each data line. In each round, one or more F-functions as round functions are executed. In the example shown in the figure, round operations using two F-function parts are performed in one round.

The structures of first and second F-function parts 41 and 42 are similar to the structure of the F-function part 30 described above with reference to FIG. 5, in which exclusive-OR operations between round keys and input values, non-linear transformation processing, and linear transformation processing are performed. Note that the round key input to each of the F-function parts is adjusted so that the number of bits of the round key is equal to the input bits. In the example shown in the figure, the round key input to each of the F-function parts 41 and 42 has n/4 bits. These keys are generated by further bit-slicing round keys forming an expanded key. Note that in a case where the number of data lines (the number of divisions) is represented by d, data input to each data line has n/d bits, and the number of bits of a key input to each of the F-functions is also adjusted to n/d bits.

Figure 6:
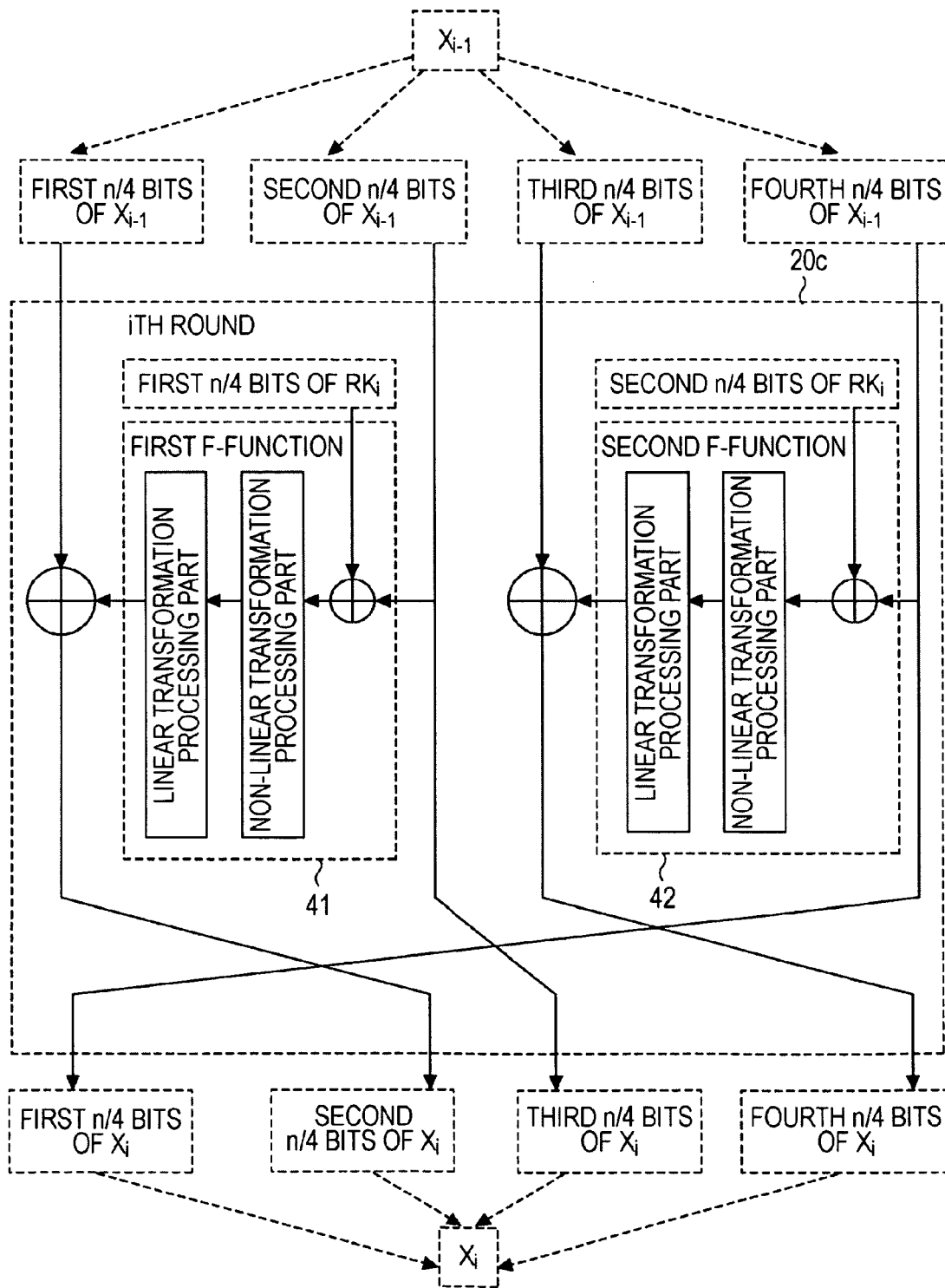
FIG. 6 is an illustration for explaining an extended Feistel structure, which is an example of the structure of the round-function executing part.

Note that the extended Feistel structure shown in FIG. 6 is a structural example in which the number of data lines (the number of divisions) is represented by d and d/2 F-functions are executed in parallel in each round. However, in extended Feistel structures, a configuration in which one or more and d/2 or less F-functions is executed in each round is possible.

As described above with reference to FIGS. 4 to 6, the round-function executing parts 20 of the encryption processing part 12 in common-key blockcipher can have the following structures:

(a) SPN (Substitution Permutation Network) structure
(b) Feistel structure
(c) extended Feistel structure Round-function executing parts with any of the above structures have a so-called SP-type structure in which a non-linear transformation layer (S-layer) and a linear transformation layer (P-layer) are connected. That is, such round-function executing parts include a non-linear transformation processing part that performs non-linear transformation processing, and a linear transformation processing part that performs linear transformation processing. Hereinafter, these transformation processing structures will be described.

(Non-Linear Transformation Processing Part)

Figure 7:
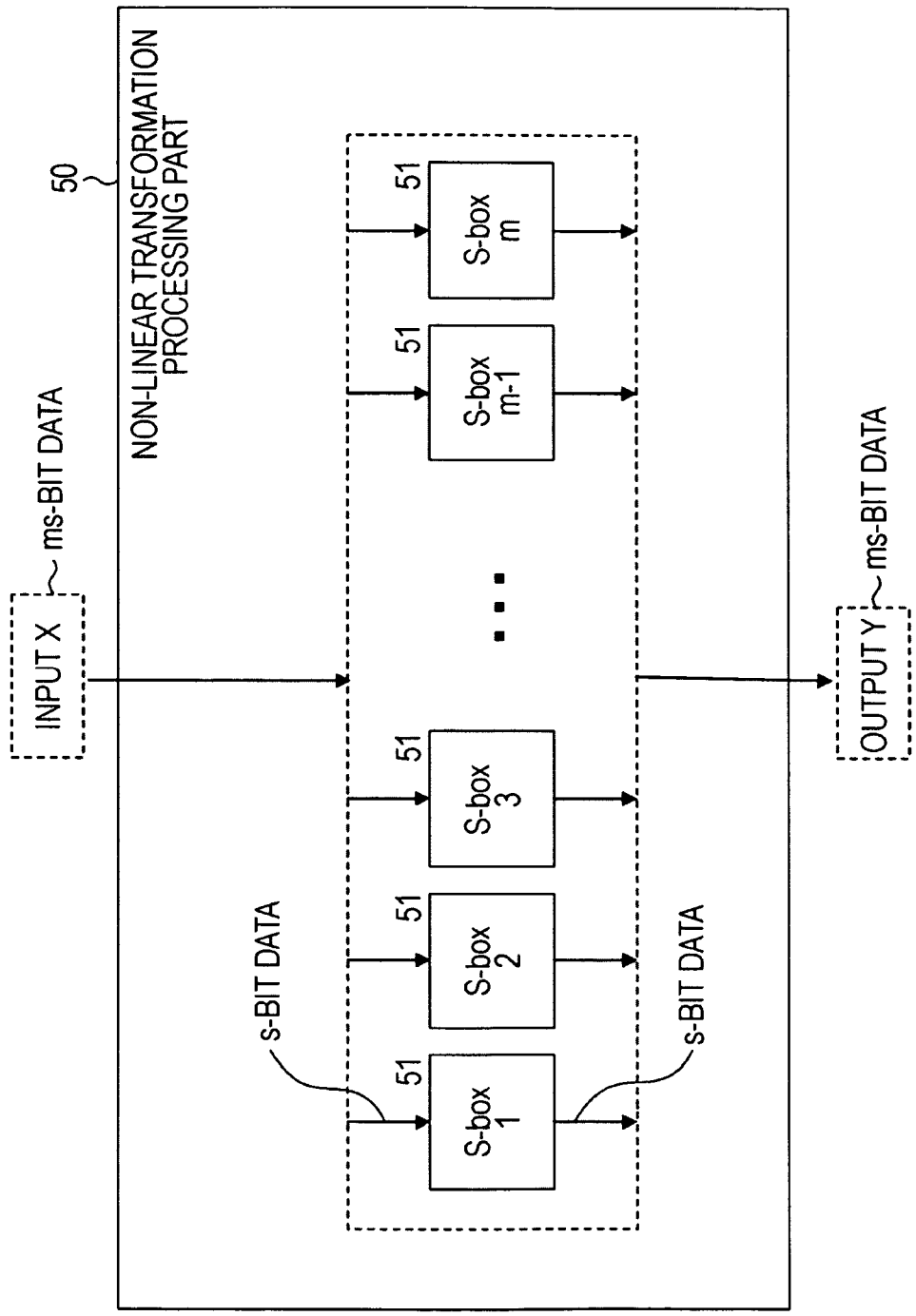
FIG. 7 is an illustration for explaining a specific example of a non-linear transformation processing part.

A specific example of the non-linear transformation processing part will be described with reference to FIG. 7. As shown in FIG. 7, specifically, a non-linear transformation processing part 50 includes m non-linear transformation tables with s-bit input and s-bit output, called S-boxes 51, and ms-bit input data is divided into s-bit units, which are then input to the corresponding S-boxes so that data transformation is performed. In each of the S-boxes 51, for example, non-linear transformation processing using a transformation table is performed.

As the size of input data increases, the cost for implementations tends to increase. In order to avoid such an increase, as shown in FIG. 7, a configuration in which target data X to be processed is divided into a plurality of units and non-linear transformation is applied to each of the units is often adopted. For example, in a case where the input size is equal to ms bits, the input data is divided into m data units each having s bits, and s bits are input to each of the m S-boxes 51. The input s bits are subjected to, for example, non-linear transformation processing using a transformation table, and the individual m S-bit outputs are combined to obtain an ms-bit non-linear transformation result.

(Linear Transformation Processing Part)

Figure 8:
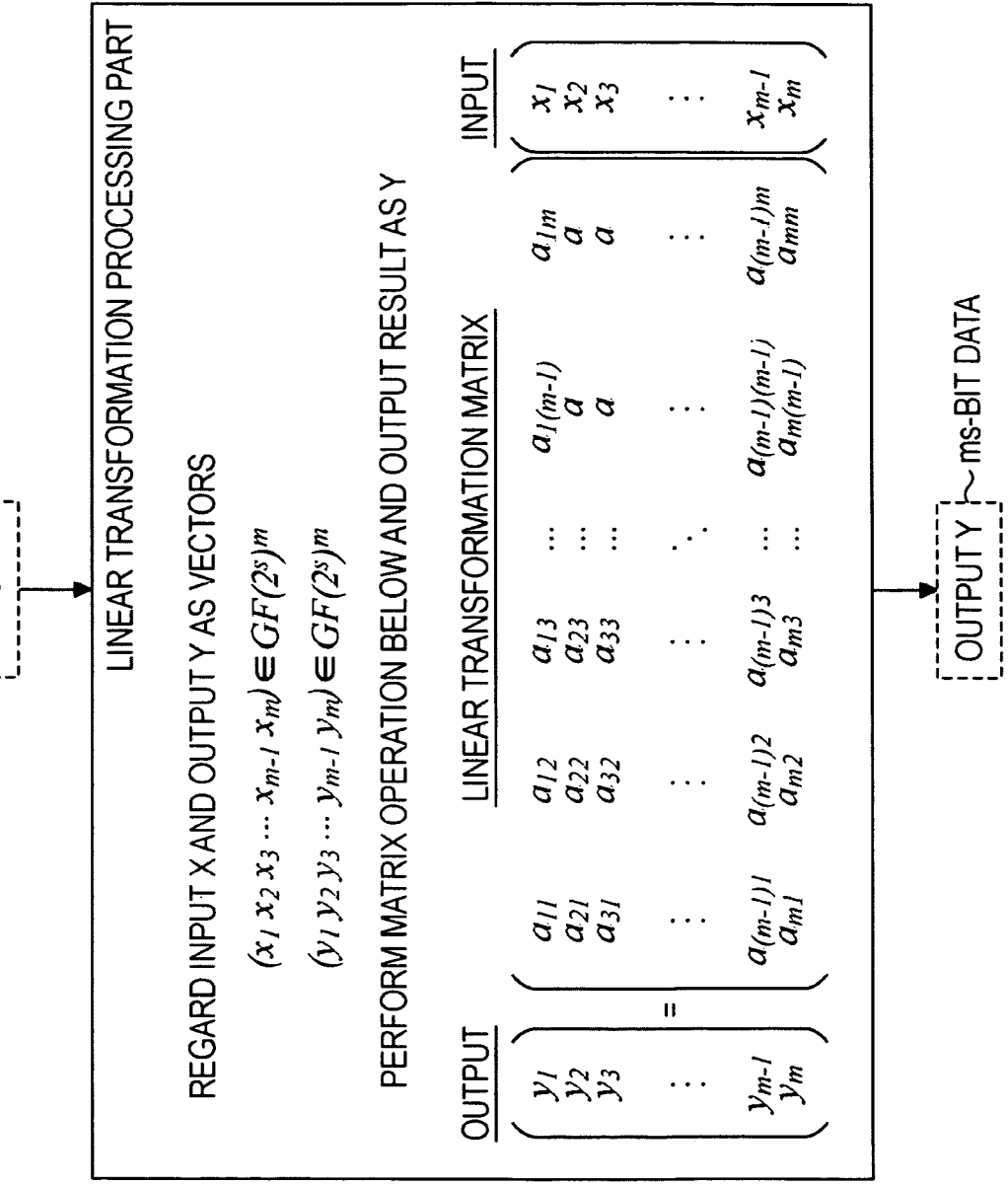
FIG. 8 is an illustration for explaining a specific example of a linear transformation processing part.

A specific example of the linear transformation processing part will be described with reference to FIG. 8. A linear transformation processing part receives an input value, for example, an ms-bit output value, which is output data from S-boxes, as an input value X, and applies linear transformation to the input to output an ms-bit result. In the linear transformation processing, for example, linear transformation processing such as permutation processing of the position of input bits is performed, and an ms-bit output value Y is output. In the linear transformation processing, for example, a linear transformation matrix is applied to the input to perform permutation processing of the position of input bits. An example of the matrix is a linear transformation matrix shown in FIG. 8.

The elements of the linear transformation matrix applied in the linear transformation processing part can generally be configured as a matrix represented using various expressions, such as field elements of an extension field: $GF(2^8)$ or elements of $GF(2)$. FIG. 8 shows an example of the structure of a linear transformation processing part defined by an m×m matrix with ms-bit input and output defined over $GF(2^s)$.

[2. Overview of Cryptanalytic Attacks]

As cryptanalytic attacks against the common-key blockcipher described above, that is, techniques for analysis of keys applied or analysis of algorithms, various techniques are known. Hereinafter, the overview of the cryptanalytic attacks will be described. Each of the attacks listed below will be sequentially described.

(2-1) Differential attacks
(2-2) Linear attacks
(2-3) Higher order differential attacks
(2-4) Interpolation attacks (2-1) Differential Attacks As one attack method against common-key ciphers, differential cryptanalysis exists. The differential cryptanalysis is described, for example, in the document "E. Biham, A. Shamir, 'Differential Cryptanalysis of DES-like Cryptosystems,' Journal of Cryptology, Vol. 4, No. 1, pp. 3-72, 1991.".

This attack method is an attack method in which propagation of data called differential values with respect to a certain cipher is observed, and an attack, that is, key estimation, can be made when propagation of the differential values occurs with high probability. The probability with which the data called differential values propagates is referred to as a differential probability.

In a case where, for a function f with n-bit input and output, an input is defined as x(n-bit), an input differential value is defined as $\Delta x$(n-bit), and an output differential value is defined as $\Delta y$(n-bit), a differential probability $DP_f(\Delta x, \Delta y)$ of the input differential value $\Delta x$ and the output differential value $\Delta y$ with respect to the function f is defined as follows:

$$DP_f(\Delta x, \Delta y) = \frac{\#\{x \in \{0, 1\}^n \mid f(x) \oplus f(x \oplus \Delta x) = \Delta y\}}{2^n} \quad \text{[Expression 1]}$$

In addition, a maximum differential probability $MDP_f$ for the function f is defined as follows:

$$MDP_f = \max_{\Delta x \neq 0, \Delta y} DP_f(\Delta x, \Delta y) \quad \text{[Expression 2]}$$

These values are uniquely determined by the function f. The function f with a greater maximum differential probability $MDP_f$ is a function that is more vulnerable to the differential attacks. Thus, it is desirable to design the function f such that $MDP_f$ is set to be as small as possible in designing of a cipher.

(2-2) Linear Attacks

In addition, as another attack method against common-key ciphers, linear cryptanalysis exists. The linear cryptanalysis is described, for example, in "M. Matsui, 'Linear Cryptanalysis Method for DES Cipher,' EUROCRYPT '93, LNCS 765, pp. 386-397, 1994.".

This attack method is an attack method in which, for a certain cipher, correlation between an exclusive-OR between specific input bits and an exclusive-OR between specific output bits is observed, and an attack, that is, key estimation, can be made when a strong correlation is found. The coefficient of the correlation of the specific input and output bits is referred to as a linear probability.

In a case where, for a function f with n-bit input and output, an input is defined as x(n-bit), an input mask value is defined as $\Gamma x$(n-bit), and an output mask value is defined as $\Gamma y$(n-bit), a linear probability $LP_f(\Gamma x, \Gamma y)$ of the input mask value $\Gamma x$ and the output mask value $\Gamma y$ with respect to the function f is defined as follows:

$$LP_f(\Gamma x, \Gamma y) = \left(2 \cdot \frac{\#\{x \in \{0, 1\}^n \mid x \cdot \Gamma x = f(x) \cdot \Gamma y\}}{2^n} - 1\right)^2 \quad \text{[Expression 3]}$$

However, in the above expression, "·" represents an inner product operation between n-bit vectors.

$$x \cdot y = \oplus_{i=1}^{n}(x_i \cdot y_i) \quad \text{[Expression 4]}$$

In addition, a maximum linear probability $MLP_f$ for the function f is defined as follows:

$$MLP_f = \max_{\Gamma x, \Gamma y \neq 0} LP_f(\Gamma x, \Gamma y) \quad \text{[Expression 5]}$$

These values are uniquely determined by the function f. The function f with a greater maximum linear probability $MLP_f$ is a function that is more vulnerable to the linear attacks. Thus, it is desirable to design the function f such that $MLP_f$ is set to be as small as possible in designing of a cipher.

(2-3) Higher Order Differential Attacks

In addition, as another attack method against common-key ciphers, higher order differential attack exists. The higher order differential attack is described, for example, in "L. R. Knudsen, 'Truncated and Higher Order Differentials,' FSE '94, LNCS 1008, pp. 196-211".

This attack method is an attack method using algebraic properties of cipher algorithms, in which when ciphertext is represented by a Boolean polynomial of all the plaintext bits, in a case where the order of the Boolean algebra is smaller than a certain order with respect to a specific number of plaintext bits, an attack, that is, key estimation, can be made.

(2-4) Interpolation Attacks

In addition, as another attack method against common-key ciphers, interpolation attack exists. The interpolation attack is described, for example, in "T. Jakobsen and L. R. Knudsen, 'The Interpolation Attack on Block Cipher,' FSE '97, LNCS 1267, pp. 28-40, 1997.".

This attack method is an attack method using algebraic properties of cipher algorithms, in which when a cipher function is represented as a polynomial function, in a case where the number of terms is small, an attack is made by recovering a cipher function including a key value.

[3. Structure of Non-Linear Transformation Processing Based on Combination of a Plurality of Small S-Boxes]

(3-1) With Regard to Effectiveness of Structure of Non-Linear Transformation Processing Based on Combination of a Plurality of Small S-Boxes As described above, a common-key blockcipher has a structure to perform cipher processing by iteration of round functions. The common-key blockcipher processing is configured so as to iterate round functions, and linear transformation processing and non-linear transformation processing are performed in the round functions. In the non-linear transformation processing, for example, as described above with reference to FIG. 7, non-linear transformation processing using S-boxes is performed. S-boxes can be applied to the non-linear transformation processing, for example, in data transformation such as hash function, as well as the above-described common-key blockcipher processing.

As described above, the input and output size of the S-boxes is generally small, and strict security evaluation can be achieved. In order to improve the security of the overall cipher or hash algorithm, as characteristics required for S-boxes, the characteristics listed below are known.

(1) The maximum differential probability is sufficiently small.

(2) The maximum linear probability is sufficiently small.

(3) The order of a Boolean algebra represented by a Boolean polynomial is sufficiently high.

(4) The number of terms in the polynomial representation of the input and output is sufficiently large.

Mainly, the characteristic (1) determines the resistance to the differential attacks, the characteristic (2) determines the resistance to the linear attacks, the characteristic (3) determines the resistance to the higher order differential attacks, and the characteristic (4) determines the resistance to the interpolation attacks. Furthermore, in order to improve security, it is important to have a low correlation between input and output bits of S-boxes, to have a change rate in the output of about ½ with respect to one-bit change in the input, etc.

Also, in addition to the requirement for high security, high performance of implementations is also required for S-boxes. For example, in an implementation structure in which software-based cipher processing or hash function is performed, a structure in which generally a table indicating an output with respect to an input is stored in a memory and non-linear transformation processing is performed using a technique called table lookup (table implementation) is implemented. Thus, the implementation performance does not greatly depend on the internal structure of the S-boxes. However, in hardware-based implementations a circuit to calculate a specific output on the basis of, for example, an input value is configured. This circuit configuration largely depends on the applied S-boxes, and the size of the circuit is also affected by the S-boxes.

As characteristics required for S-boxes in order to maintain the security of cipher algorithms or hash algorithms, as described above, the characteristics listed below exists.

(1) The maximum differential probability is sufficiently small.

(2) The maximum linear probability is sufficiently small.

(3) The order of a Boolean algebra represented by a Boolean polynomial is sufficiently high.

(4) The number of terms in the polynomial representation of the input and output is sufficiently large.

As a technique for efficiently generating the S-boxes satisfying the above requirements, a method using an exponentiation function over an extension field is commonly known. In this technique, if the order of the extension field and the multiplier of the exponentiation are appropriately selected, S-boxes with extremely excellent characteristics can be generated.

In a case where, actually, the input and output of an S-box with n-bit input and output are set to x and y, respectively, and each of the input x and output y is a basis of an extension field $GF(2^n)$, when $y=f(x)$ is given by the following expressions:

$$y = x^{2^t+1}$$ [Expressions 6]

(t is an arbitrary integer)

$$y = x^{-1}$$

it is commonly known that an S-box optimum in terms of the maximum differential probability and the maximum linear probability can be configured.

As examples of the S-box configured using such a technique, S-boxes applied in AES, Camellia, and MISTY are available.

The S-boxes of AES or Camellia can also be configured to be S-boxes as an inverse basis function over $GF((2^4)^2)$. Thus, it can be said that extremely excellent characteristics in terms of security can be achieved, and moreover, performance of hardware implementations is also high.

However, in recent years, even for such S-boxes, problems regarding attacks using the characteristic algebraic properties of the S-boxes and their excessively uniform diffusion have been pointed out.

In view of the above-described points, a method for configuring S-boxes having no characteristic algebraic properties has been conceived, and in order that the S-boxes do not have a strong algebraic structure, a method for generating S-boxes using a technique for selecting elements in a random manner or by a corresponding technique has been conceived. In a case where S-boxes are generated using such a technique, in many cases, the S-boxes do not have a characteristic algebraic structure, and furthermore, do not provide uniform diffusion, unlike an exponentiation function over an extension field. Thus, it can be said that measures have been taken against the above-described problems.

However, since the number of bijective S-boxes with n-bit input and output, which is equal to the factorial of $2^n$, exists, it is actually difficult, in a case where n is relatively large, to efficiently generate S-boxes having excellent characteristics by using a technique for randomly generating S-boxes with n-bit input and output and checking the characteristics one-by-one.

In addition, in a case where the elements of S-boxes are selected in a completely random manner, only a technique called table implementation can be primarily used even for hardware implementations. Thus, the implementation efficiency is greatly reduced.

In view of the foregoing problems, an attempt has been made to randomly generate S-boxes with small input and output size and to combine a plurality of S-boxes generated in this manner to generate a larger S-box. For example, S-boxes of CRYPTON ver. 0.5, CRYPTON ver. 1.0, Whirlpool, and

FOX, can be considered to be S-boxes generated based on such a technique. Hereinafter, a specific example of the structure of these S-boxes and the problems therewith will be described.

(3-2) Structure of Non-Linear Transformation Processing Based on Combination of a Plurality of Small S-Boxes of Conventional Type and Problems Therewith Hereinafter, the structure of non-linear transformation processing based on a combination of a plurality of small S-boxes of a conventional type and problems therewith will be described with respect to each of the following structures:

(a) CRYPTON ver. 0.5

(b) CRYPTON ver. 1.0

(c) Whirlpool (d) FOX (a) CRYPTON ver. 0.5

Figure 9:
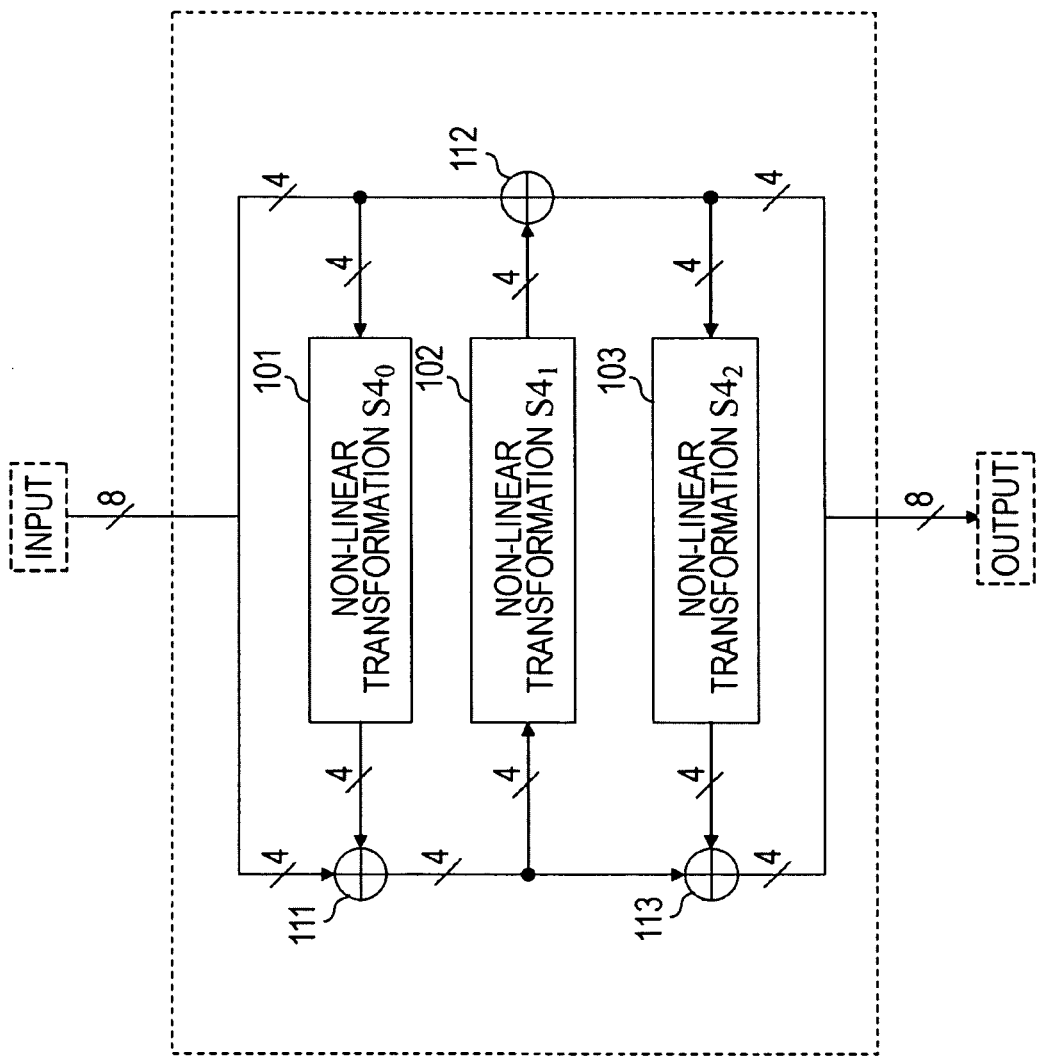
FIG. 9 is an illustration for explaining the structure of an S-box of CRYPTON ver. 0.5.

For example, S-boxes of CRYPTON ver. 0.5 have a structure shown in FIG. 9. An S-box $[S4_0]$ 101, an S-box $[S4_1]$ 102, and an S-box $[S4_2]$ 103 are S-boxes with 4-bit input and output. These three S-boxes and exclusive-OR operation parts 111 to 113 are combined to achieve a structure in which an 8-bit input is subjected to non-linear transformation to obtain an 8-bit output. Note that in the notation [S4$_n$] representing an S-box shown in the figure, 4 indicates an S-box with 4-bit input and output, and n indicates the identifier of the S-box. All the S-box [S4$_0$] 101, the S-box [S4$_1$] 102, and the S-box [S4$_2$] 103 are S-boxes with 4-bit input and output, and are different from one another in that they perform different types of non-linear transformation processing.

Since this structure employs the so-called three-round Feistel structure, the order of a Boolean algebra is low and, furthermore, the critical path is long. That is, a structure in which in order to reach the final output from the input, three small S-boxes must be passed through is provided. Thus, this structure has a characteristic in which the implementation performance is not so high.

(b) CRYPTON ver. 1.0

Figure 10:
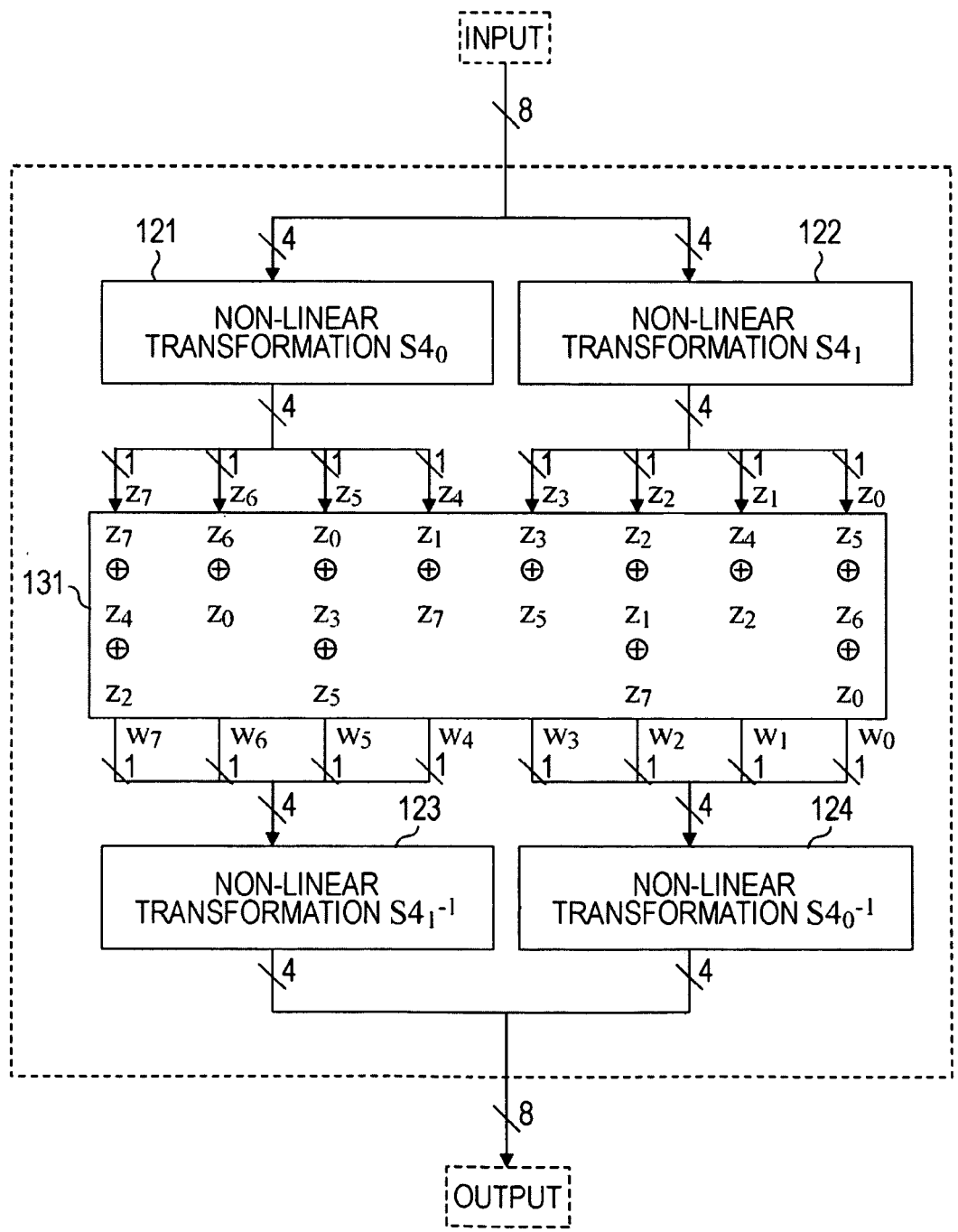
FIG. 10 is an illustration for explaining the structure of an S-box of CRYPTON ver. 1.0.

In addition, S-boxes of CRYPTON ver. 1.0 have a structure shown in FIG. 10. The S-boxes are constituted by an S-box [S4$_0$] 121, an S-box [S4$_1$] 122, an S-box [S4$_1^{-1}$] 123 for performing transformation inverse to that performed by the S-box [S4$_1$] 122, an S-box [S4$_0^{-1}$] 124 for performing transformation inverse to that performed by the S-box [S4$_0$] 121, and bitwise operation parts 131 and 132 that perform linear transformation processing based on bitwise operations.

After the upper 4 bits of the input 8 bits are subjected to non-linear transformation by the S-box [S4$_0$] 121, linear transformation is performed on the resulting bits input to the bitwise operation part 131. The result of the linear transformation is input to the S-box [S4$_1^{-1}$] 123, and a non-linear transformation result is output. After the lower 4 bits are subjected to non-linear transformation by the S-box [S4$_1$] 122, linear transformation is performed on the resulting bits input to the bitwise operation part 131. The result of the linear transformation is input to the S-box [S4$_0^{-1}$] 123, and a non-linear transformation result is output.

In this structure, since a bitwise operation performed by the bitwise operation part 131 in the intermediate stage is selected from an 8×8 matrix of 1-bit elements, that is, a 64-bit space, the selection is difficult. That is, for non-linear transformation, a structure in which, basically, from an 8-bit input to be subjected to non-linear transformation, an 8-bit output is obtained without bias as non-linear transformation results corresponding to the 8-bit input is required. Thus, there arises a problem in that it is difficult to select a matrix used in the bitwise operation parts 131 and 132 in the intermediate stage so that the above requirement can be satisfied.

(c) Whirlpool

Figure 11:
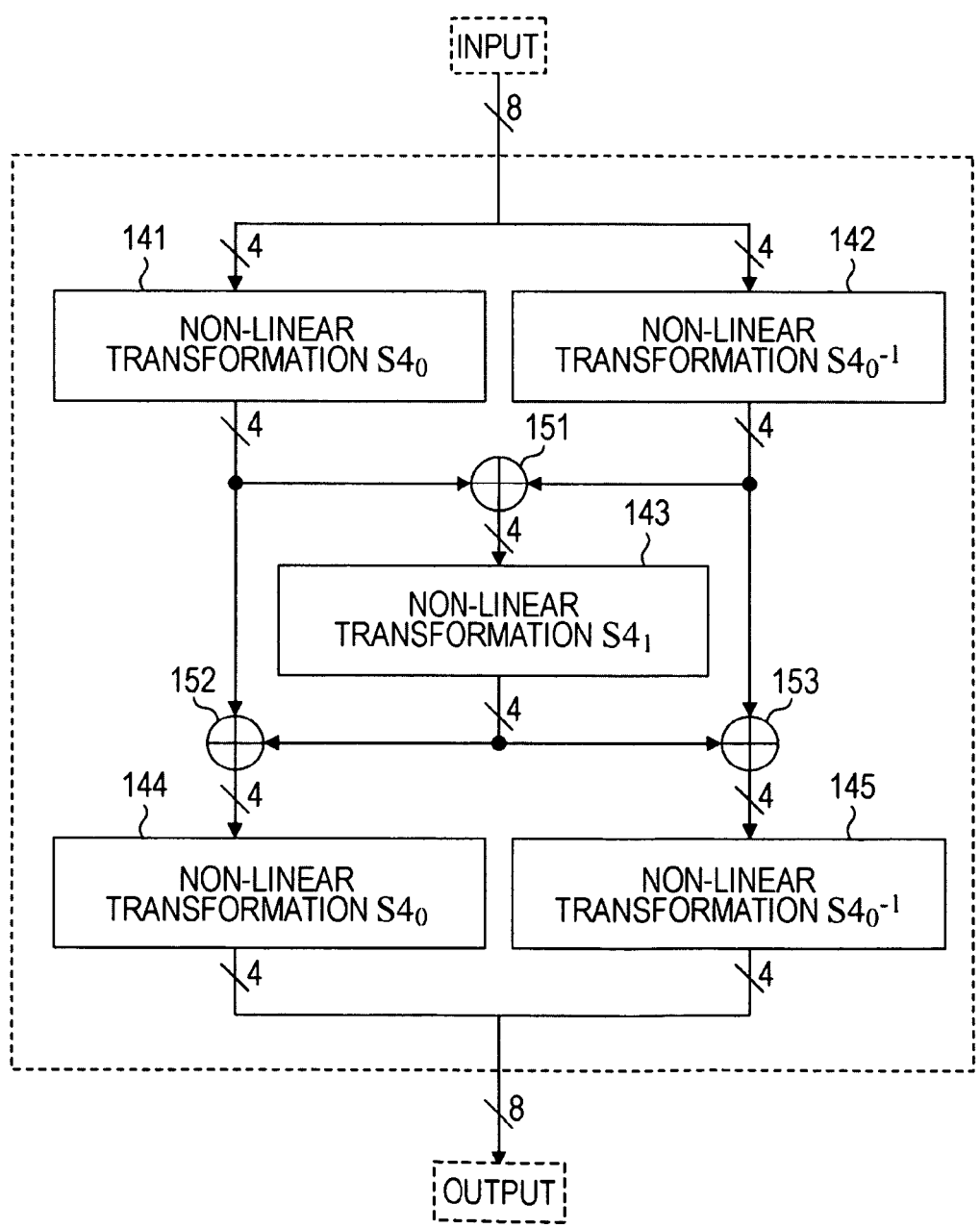
FIG. 11 is an illustration for explaining the structure of an S-box of Whirlpool.

In addition, S-boxes of Whirlpool have a structure shown in FIG. 11. The S-boxes has a structure in which S-boxes [S4$_0$] 141 and 144, S-boxes [S4$_0^{-1}$] 142 and 145 for performing transformation inverse to that performed by the S-boxes [S4$_n$], and an S-box [S4$_1$] 143 are combined using exclusive-OR operation parts 131 to 153.

In this structure, the number of necessary small S-boxes is large, such as five, and, furthermore, the critical path is long. That is, a structure in which in order to reach the final output from the input, three small S-boxes must be passed through is provided. Thus, there arises a problem in that the implementation performance is not so high.

(d) FOX

Figure 12:
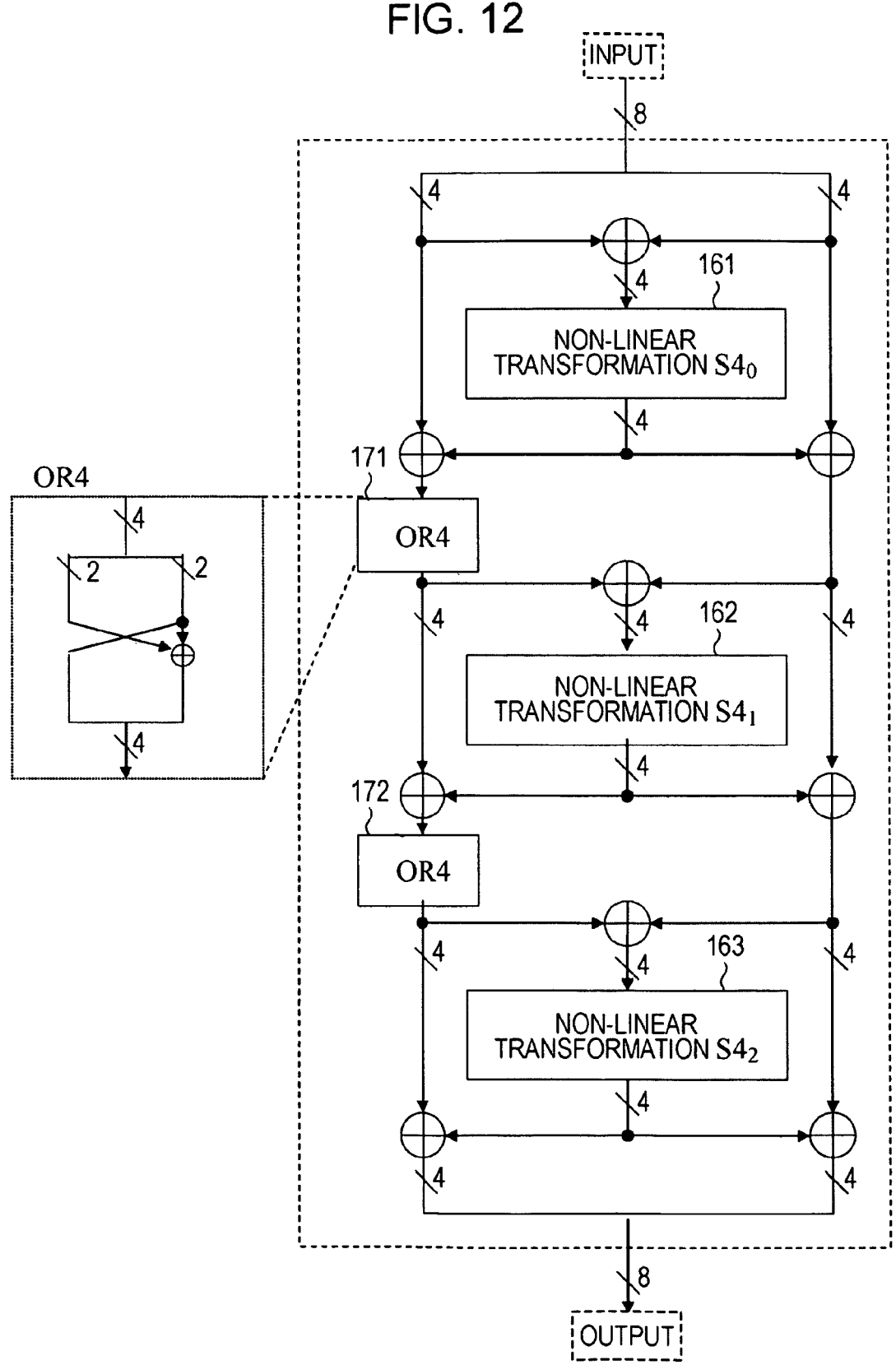
FIG. 12 is an illustration for explaining the structure of an S-box of FOX.

In addition, S-boxes of FOX have a structure shown in FIG. 12. The S-boxes have a structure in which three types of S-boxes 161 to 163 with 4-bit input and output and OR circuits 171 and 172 with 4-bit input and output are connected by exclusive-OR operation parts.

In this structure, although the number of necessary small S-boxes is small, such as three, the number of exclusive-OR operation parts (XOR) is large as a whole and the critical path is also long. In order to reach the final output from the input, three small S-boxes must be passed through. Thus, there arises a problem in that the implementation performance is not so high.

(3-3) Structure of Non-Linear Transformation Processing Based on Combination of a Plurality of Small S-Boxes According to the Present Invention Next, the structure of non-linear transformation processing based on a combination of a plurality of small S-boxes according to the present invention will be described. As described above, concerning the structure of non-linear transformation processing based on a combination of a plurality of small S-boxes, various types of structures have already been proposed. However, each of these structures has a problem of a long critical path, a problem of a difficulty in setting a linear transformation matrix, and the like.

First, the terms listed below, which are necessary for understanding of the structure of non-linear transformation processing according to the present invention, will be described.

(a) Number of branches and optimal diffusion layer (b) Matrix operation over extension field (a) Number of Branches and Optimal Diffusion Layer First, the number of branches and optimal diffusion mappings will be described.

For mappings from (n×a)-bit data to (n×b)-bit data, $$\theta: \{0,1\}^{na} \rightarrow \{0,1\}^{nb},$$

the number of branches Bn(θ) is defined as follows:

$$B_n(\theta) = \min_{\alpha \neq 0}\{hw_n(\alpha) + hw_n(\theta(\alpha))\} \qquad \text{[Expression 7]}$$

Here, $\min_{\alpha \neq 0}(X_\alpha)$ denotes the minimum value of all $X_\alpha$ satisfying a $\alpha \neq 0$, and $hw_n(Y)$ denotes the function for returning the number of (non-zero) elements for which all the n-bit data units are not zero when a sequence of bits Y is represented in units of n bits. In this case, the mappings θ in which the number of branches B(θ) is equal to b+1 are defined as optimal diffusion mappings. In addition, in the following description, a matrix satisfying the ODM is defined as an MDS (Maximum Distance Separable) matrix.

(b) Matrix Operation Over Extension Field

A matrix operation performed over an extension field GF($2^n$) generated by an nth-order irreducible polynomial p(x) defined over the ground field GF(2) is referred to as a matrix operation over the extension field.

For example, $$\begin{pmatrix} y_0 \\ y_1 \end{pmatrix} = \begin{pmatrix} a_{0,0} & a_{0,1} \\ a_{1,0} & a_{1,1} \end{pmatrix} \begin{pmatrix} x_0 \\ x_1 \end{pmatrix} \qquad \text{[Expression 8]}$$

the matrix operation above will be considered.

In the above matrix operation, outputs $y_0$ and $y_1$ are represented as follows:

$$y_0 = a_{0,0}x_0 + a_{0,1}x_1$$

$$y_1 = a_{1,0}x_0 + a_{1,1}x_1$$

In this case, all variables such as $a_{0,0}$ and $x_0$ are regarded as basis over the extension field GF($2^n$), and all the operations are performed over the extension field GF($2^n$) The technique for performing a matrix operation using the above method is referred to as a matrix operation over the extension field.

The structure of non-linear transformation processing according to the present invention realizes a structure of non-linear transformation processing that has overcome the problems with the above-described conventional structure of non-linear transformation processing based on a combination of a plurality of small S-boxes, that is, the problem of a long critical path, the problem of a difficulty in setting a linear transformation matrix, and the like.

In the structure according to the present invention, in order to efficiently generate bijective S-boxes with n-bit input and output in which simple representation over an extension field $GF(2^n)$ is difficult and the implementation performance (in particular, hardware) is high, matrix operations having elements of the same size as the input and output size of highly branched small S-boxes are combined at the position where small S-boxes are combined, thereby achieving a non-linear transformation processing structure as a large S-box. Specifically, the highly branched matrix operation refers to a matrix having m or more branches with respect to an m×m matrix.

As a highly branched matrix, for example, the MDS (Maximum Distance Separable) matrix for performing the optimal diffusion mappings described above is selected. The MDS matrix is a matrix in which any sub-matrix constituting the matrix is non-singular. Note that a non-singular matrix is a matrix having an inverse matrix. In a case where a matrix is represented by A and an inverse matrix is represented by $A^{-1}$, $$AA^{-1}=A^{-1}A=E,$$

where E denotes a unit matrix,
the matrix A having the inverse matrix $A^{-1}$ satisfying the condition above is a non-singular matrix.

Figure 13:
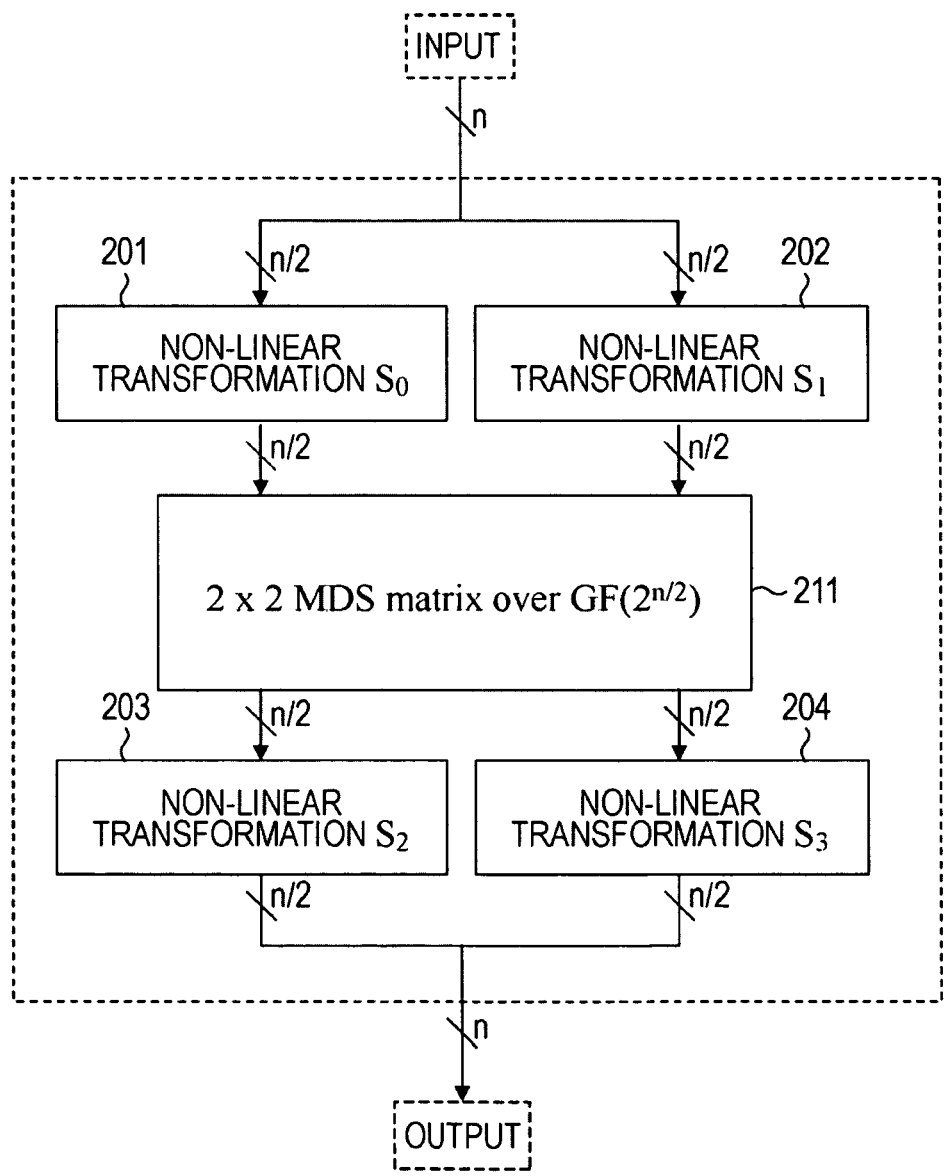
FIG. 13 is an illustration showing an example of the structure of an S-box of n-bit input and output as a structure of non-linear transformation processing according to an embodiment of the present invention.
Figure 14:
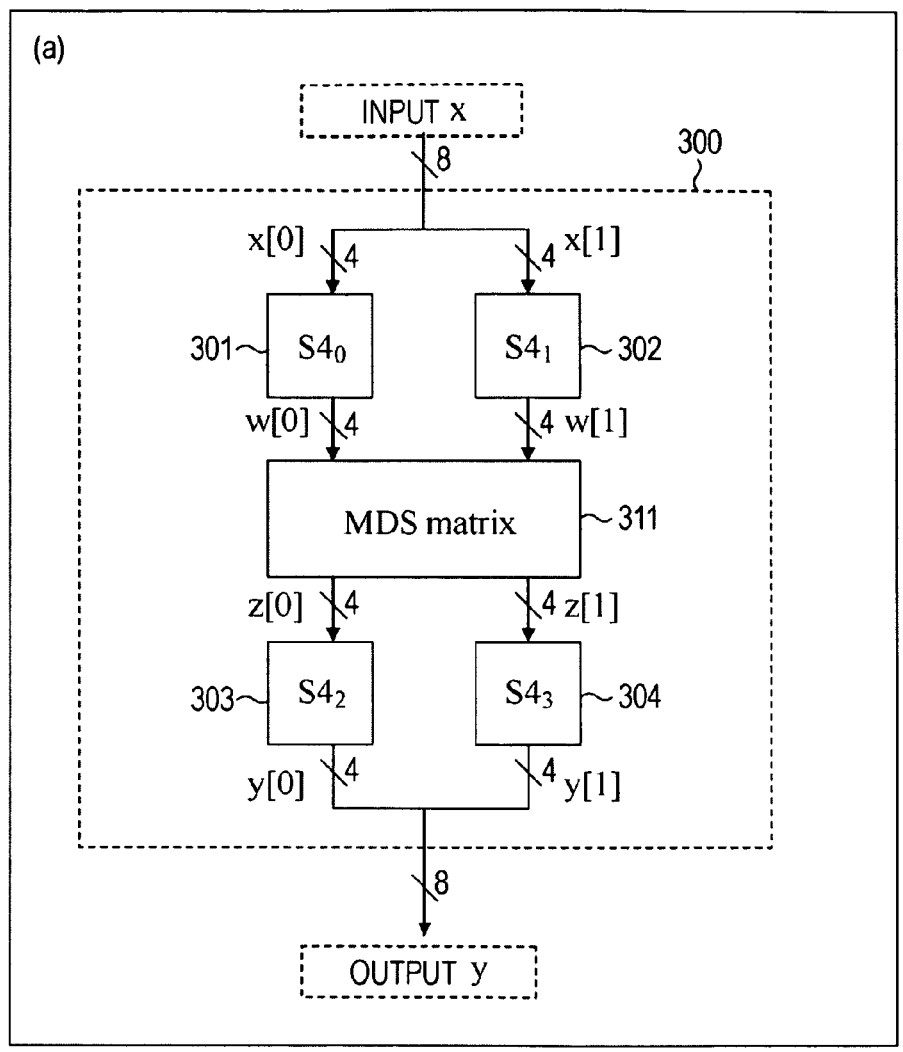
FIG. 14 includes illustrations for explaining a specific example of the structure of an S-box for performing non-linear transformation of 8-bit input and output according to an embodiment of the present invention.
Figure 15:
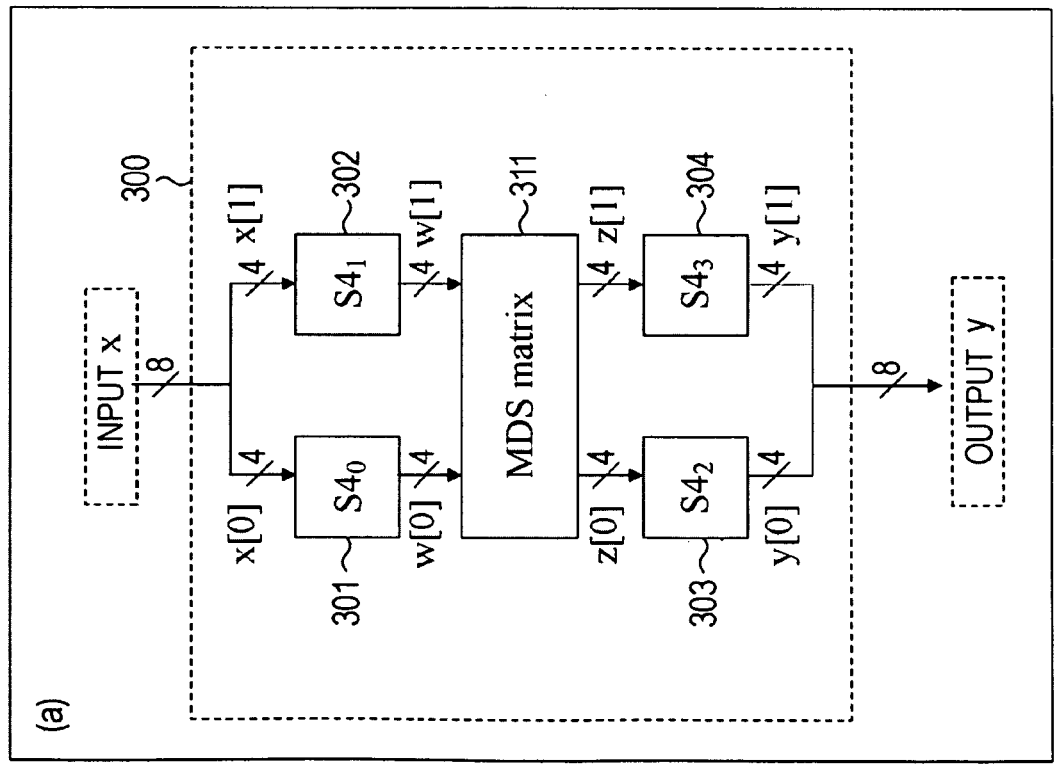
FIG. 15 includes illustrations for explaining a specific example of the structure of an S-box for performing non-linear transformation of 8-bit input and output according to an embodiment of the present invention.

FIG. 13 shows an example of the structure of an S-box with n-bit input and output as the structure of non-linear transformation processing according to an embodiment of the present invention. The structure shown in FIG. 13 is a structure that is constituted by four bijective S-boxes 201 to 204 with n/2-bit input and output and a linear transformation processing part 211 formed by a 2×2 MDS (Maximum Distance Separable) matrix defined over an extension field $GF(2^{n/2})$ and that performs non-linear transformation processing of n-bit input and output.

The upper n/2 bits and the lower n/2 bits of input n bits are input to the bijective S-box [$S_0$] 201 and S-box [$S_1$] 202 each with n/2-bit input and output, respectively, and are subjected to non-linear transformation processing in the respective S-boxes. Then, the resulting bits are input to the linear transformation processing part 211 constituted by the 2×2 MDS matrix defined over the extension field $GF(2^{n/2})$, and are subjected to linear transformation processing based on the MDS matrix. Then, the upper n/2 bits and the lower n/2 bits of the n bits as linear transformation results are input to the bijective S-box [$S_2$] 203 and S-box [$S_3$] 204 each with n/2-bit input and output, respectively, and are subjected to non-linear transformation processing in the respective S-boxes. Accordingly, a structure to obtain n bits as an output result is provided.

In a case where a highly branched diffusion transformation matrix, such as the MDS matrix used in the linear transformation processing part 211 shown in FIG. 13, is used, it is ensured that the outputs of the small S-box [$S_0$] 201 and S-box [$S_1$] 202 in the previous stage are arranged in good balance at the inputs of the small S-box [$S_2$] 203 and S-box [$S_3$] 204 in the subsequent stage. Thus, a large S-box, as a whole, with an excellent characteristic can be generated. In addition, the size of the elements of the MDS matrix corresponding to the diffusion transformation matrix used in the linear transformation processing part 211 is uniquely determined by the input and output size (n/2) of the small S-boxes. Thus, even if the input and output size (n) of the large S-box is large, the space of a selectable matrix is limited. Therefore, the number of branches of the matrix can be easily checked.

The elements of the MDS matrix as a diffusion transformation matrix used in the linear transformation processing part 211 in the structure shown in FIG. 13 have a size of n/2 bits. Since the matrix is a 2×2 matrix, the number of elements is four. Even if all the matrices are to be checked, since the number of branches is about $2^{n/2 \times 4}$, all the matrices can be checked easily. However, note that the matrix operation to be performed is a matrix operation over an extension field $GF(2^n)$ generated by an nth-order irreducible polynomial p(x) defined over GF(2).

In a case where S-boxes are generated using this technique, since it can be considered that only the small S-boxes 201 to 204 with an input and output size of n/2 bits in the structure shown in FIG. 13 can be represented by a simple algebraic expression, elements over the extension field $GF(2^n)$ seem to be random. Thus, it can be considered that providing a simple algebraic representation over $GF(2^n)$ is difficult. In addition, it is expected that, unlike an exponentiation operation over an extension field, no uniform diffusion be provided.

Furthermore, since a configuration with a simple calculation and a short path can be achieved by appropriately selecting a matrix, implementation efficiency higher than that of S-boxes randomly generated by n bits or conventional S-boxes configured using a combination of small S-boxes can be achieved.

A specific example of the structure of an S-box performing non-linear transformation of 8-bit input and output with the structure shown in FIG. 13 will be described with reference to FIGS. 14 to 17.

The structure shown in FIG. 14(a) is the same as the structure shown in FIG. 15(a). FIGS. 14(a) and 15(a) show, as a specific example of the structure of an S-box performing non-linear transformation of 8-bit input and output with the structure shown in FIG. 13, the structure of an 8-bit S-box 300. FIG. 14(b) shows a transformation table of four S-boxes 301 to 304 with 4-bit input and output, which are elements of the 8-bit S-box 300 shown in FIG. 14(a). The numerical values used in this table are expressed in hexadecimal notation. This table indicates output values of each of the S-boxes 301 to 304 with respect to inputs: x=0 to F (in hexadecimal notation). In addition, in FIG. 15(c), a specific example in which as a linear transformation processing part 311 shown in FIG. 15(a) (=FIG. 14(a)), highly branched diffusion transformation, specifically, an MDS matrix 311, which is the optimal diffusion mappings [ODM], is used is shown.

The processing of the S-box with 8-bit input and output shown in FIG. 14(a) for performing non-linear transformation will be described. First, x(8-bit), which is input to the 8-bit S-box 300, is divided into half, that is, into blocks x[0] and x[1] each having 4 bits. Then, x[0] is input to the S-box [$S4_0$] 301 with 4-bit input and output, and x[1] is input to the S-box [$S4_1$] 302 with 4-bit input and output. Thus, outputs w[0] and w[1] are obtained as non-linear transformation results from the S-boxes 301 and 302, respectively. The S-box [$S4_0$] 301 and the S-box [$S4_1$] 302 are randomly selected 4-bit S-boxes, and non-linear transformation is performed as transformation processing in accordance with the table shown in FIG. 14(b).

Note that the S-box [$S4_0$] 301 and the S-box [$S4_1$] 302 are S-boxes satisfying all the properties to be satisfied by S-boxes, such as a sufficiently low maximum differential probability and a sufficiently low maximum linear probability. In addition, since these S-boxes are S-boxes with 4-bit input and output, S-boxes satisfying such properties can actually be found.

The outputs w[0] and w[1] of the S-box [$S4_0$] 301 and the S-box [$S4_1$] 302 are input to the linear transformation processing part 311 that performs linear transformation using an MDS matrix allowing optimal diffusion mappings [ODM], and z[0] and z[1] are output as results of linear transformation based on the MDS matrix. The linear transformation processing part 311 performs linear transformation based on a matrix operation over an extension field $GF(2^4)$ generated by a fourth-order irreducible polynomial: $p(x)=x^4+x+1$ defined over $GF(2)$, and outputs the z[0] and z[1]. The MDS matrix serving as the linear transformation processing part 311 performs linear transformation processing based on a 2×2 matrix constituted by four elements having basis, as elements, over the extension field $GF(2^4)$ defined by the fourth-order irreducible polynomial over $GF(2)$.

Specific processing of the matrix operation is shown in FIG. 15(c). In a case where the 2×2 MDS matrix shown in FIG. 15(c) is applied, the outputs z[0] and z[1] are calculated, as shown below, on the basis of the inputs w[0] and w[1].

$$z[0]=w[0](XOR)w[1]\times 2$$

$$z[1]=w[0]\times 2(XOR)w[1]$$

The upper 4 bits z[0] and lower 4 bits z[1] in the 8-bit data obtained as results of linear transformation by the MDS matrix allowing optimal diffusion mappings [ODM] are input to the S-box [$S4_2$] 303 with 4-bit input and output and the S-box [$S4_3$] 304 with 4-bit input and output, respectively, and are subjected to non-linear transformation in these 4-bit S-boxes so that outputs y[0] and y[1] are obtained. As with the S-box [$S4_0$] 301 and the S-box [$S4_1$] 302, the S-box [$S4_2$] 303 and the S-box [$S4_3$] 304 are also randomly selected 4-bit S-boxes with excellent characteristics, and perform data transformation in accordance with the table shown in FIG. 14(b). Finally, 8-bit data obtained by combining the 4-bit data y[0] and y[1] output from the S-box [$S4_2$] 303 and the S-box [$S4_3$] 304 is set as a final output y (8-bit) of the S-box 300 with 8-bit input and output.

Similarly to the structure shown in FIG. 14(a), the structure shown in FIG. 16(a) is a specific example of the structure of an 8-bit S-box 320 performing non-linear transformation of 8-bit input and output with the structure shown in FIG. 13. FIG. 16(b) shows a transformation table of four S-boxes 321 to 324 with 4-bit input and output, which are elements of the 8-bit S-box 320 shown in FIG. 16(a). The numerical values used in this table are expressed in hexadecimal notation. This table indicates output values of each of the S-boxes 321 to 324 with respect to the inputs: x=0 to F (in hexadecimal notation). In addition, in FIG. 17(c), a specific example in which, as a linear transformation processing part 331 shown in FIG. 17(a) (=FIG. 16(a)), an MDS matrix 331 that allows optimal diffusion mappings [ODM] is used is shown.

Figure 16:
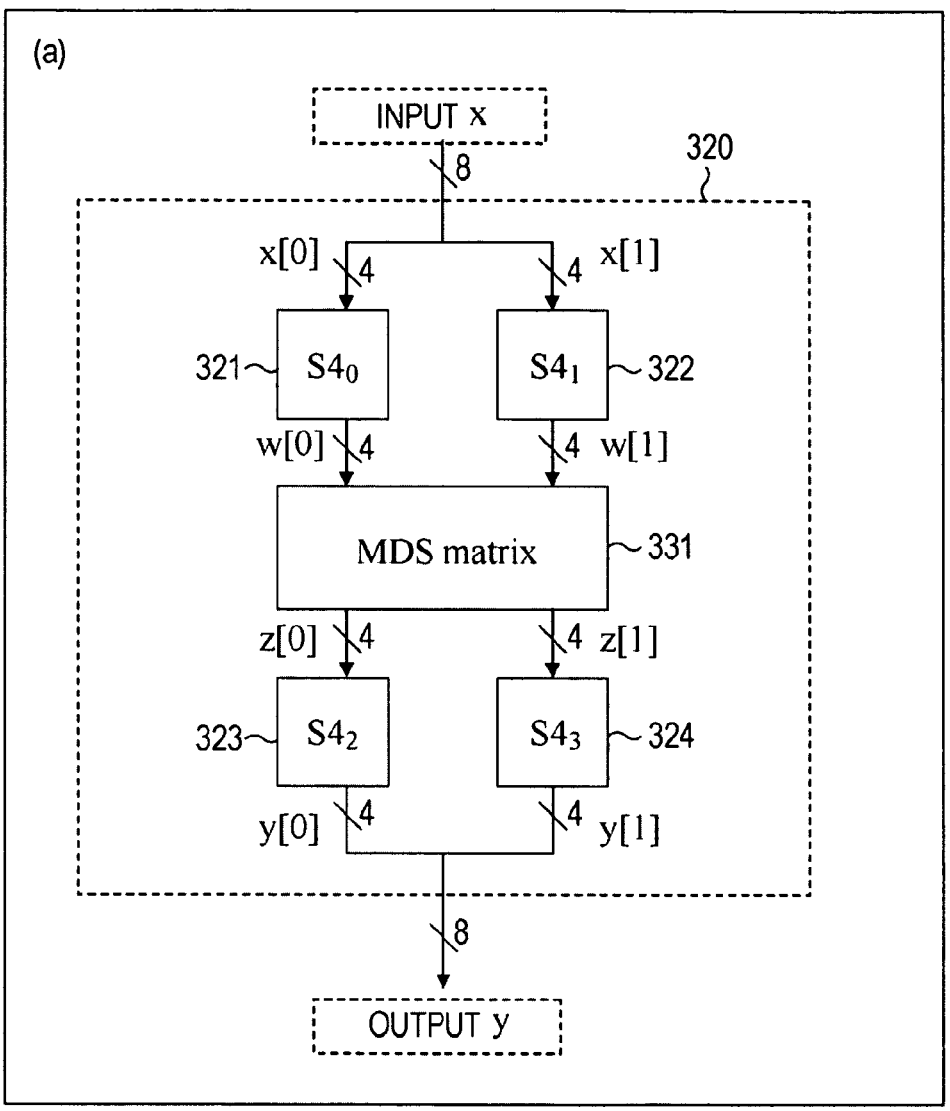
FIG. 16 includes illustrations for explaining a specific example of the structure of an S-box for performing non-linear transformation of 8-bit input and output according to an embodiment of the present invention.
Figure 17:
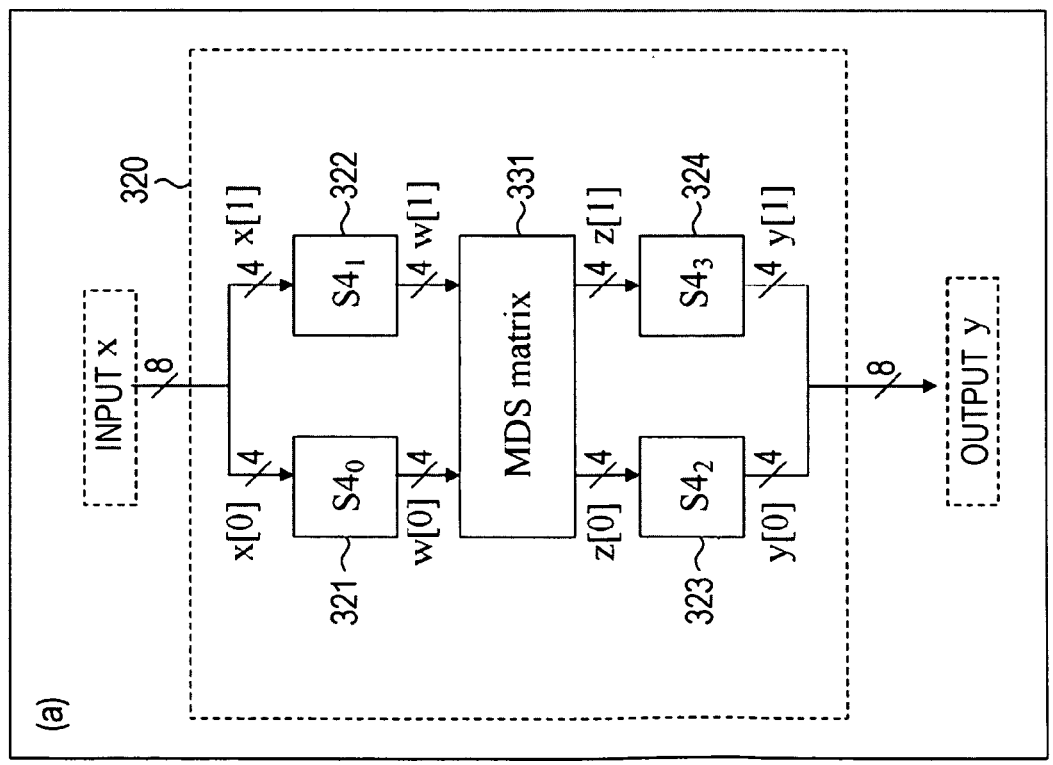
FIG. 17 includes illustrations for explaining a specific example of the structure of an S-box for performing non-linear transformation of 8-bit input and output according to an embodiment of the present invention.

The structural examples shown in FIGS. 16 and 17 are different in the points described below.

The S-boxes 321 to 324 with 4-bit input and output perform non-linear transformation in accordance with the table shown in FIG. 16(b).

The linear transformation processing part 331 performs transformation processing according to the process shown in FIG. 17(c).

The linear transformation processing part 331 performs linear transformation using a matrix operation over an extension field $GF(2^4)$ generated by a fourth-order irreducible polynomial: $p(x)=x^4+x+1$ defined over $GF(2)$, and outputs z[0] and z[1]. The MDS matrix serving as the linear transformation processing part 311 performs linear transformation processing based on a 2×2 matrix constituted by four elements having basis, as elements, over the extension field $GF(2^4)$ of 2 defined by the fourth-order irreducible polynomial.

Specific processing of the matrix operation is shown in FIG. 17(c). In a case where the 2×2 MDS matrix shown in FIG. 17(c) is applied, the outputs z[0] and z[1] are calculated, as shown below, on the basis of the inputs w[0] and w[1].

$$z[0]=w[0](XOR)w[1]$$

$$z[1]=w[0](XOR)w[1]\times 2$$

The examples shown in FIGS. 14 to 17 illustrate S-boxes that perform non-linear transformation processing of 8-bit input and output, and the elements of the MDS matrix used in each of the linear transformation processing parts 311 and 331 have a size of n/2 bits. Since the matrix is a 2×2 matrix, the number of elements is four. Even if all the matrices are to be checked, since the number of branches is about $2^{n/2\times 4}$, all the matrices can be checked easily. As described above, in a case where S-boxes are generated using this technique, since it can be considered that only small S-boxes can be represented by a simple algebraic expression, elements over an extension field $GF(2^n)$ seem to be random. Thus, it can be considered that providing a simple algebraic representation over $GF(2^n)$ is difficult. In addition, unlike an exponentiation operation over an extension field, no uniform diffusion is provided. In addition, since only two small S-boxes exist on a path for obtaining the output from the input, a configuration with a simple calculation and a short path can be achieved by appropriately selecting a matrix. Thus, implementation efficiency higher than that of S-boxes randomly generated by n bits or conventional S-boxes configured using a combination of small S-boxes can be achieved.

Figure 18:
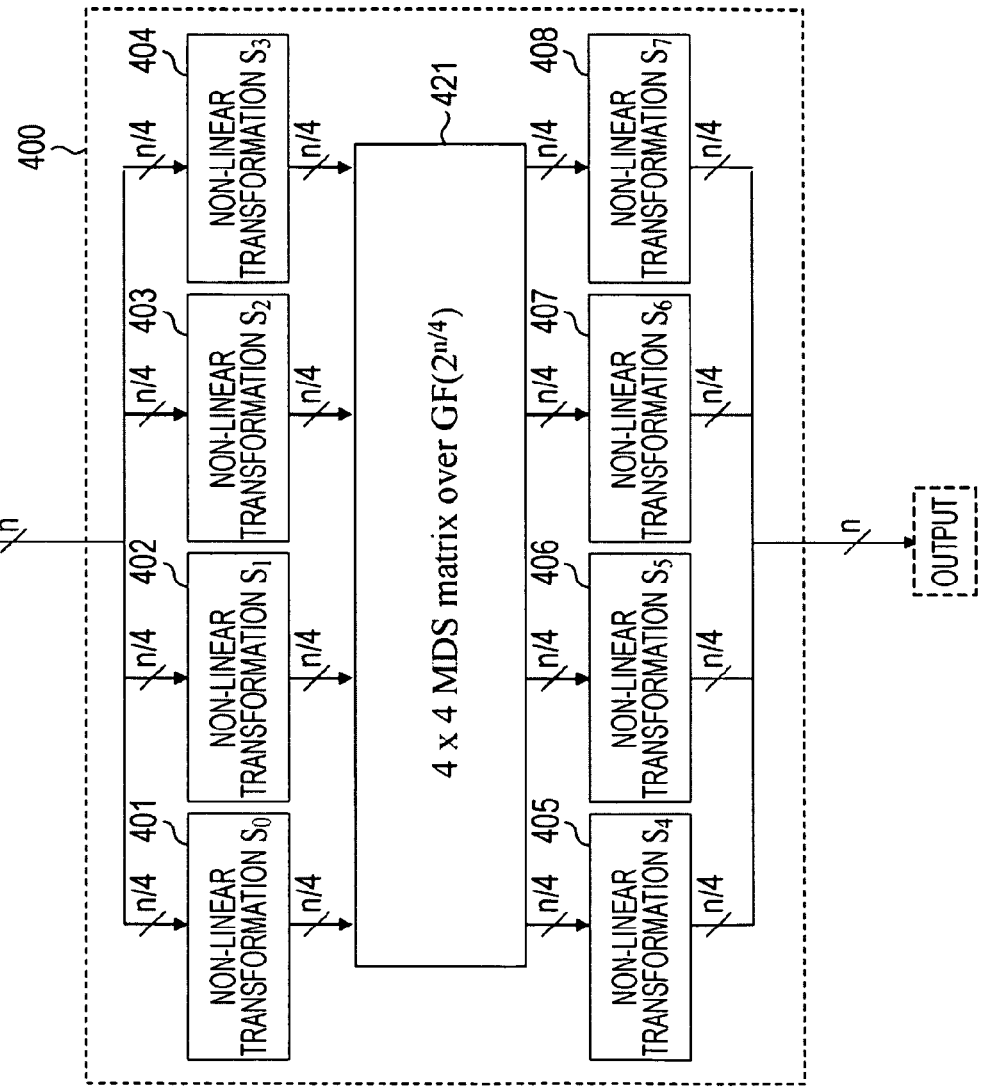
FIG. 18 is an illustration for explaining an example of the structure of an S-box for performing non-linear transformation according to an embodiment of the present invention.

In the structural examples shown in FIGS. 13 to 17, a structure is provided in which input n bits are divided into two units and the upper n/2 bits and the lower n/2 bits are input to S-boxes each with n/2-bit input and output, and in which the upper n/2 bits and the lower n/2 bits of n-bit output from a linear transformation processing part are input to S-boxes [$S_2$] each with n/2-bit input and output so that a non-linear transformation processing result is obtained. The number of small S-boxes that receive the units into which the input bits are divided is not limited to two and may be any other number. FIG. 18 shows an example of the structure of an n-bit S-box 400 that divides input n bits into four units and performs non-linear transformation processing in units of n/4 bits by using small S-boxes each with n/4-bit input and output.

The structure of the n-bit S-box 400 shown in FIG. 18 is a structure that is constituted by eight bijective S-boxes 401 to 408 with n/4-bit input and output and a linear transformation processing part 421 formed by a 4×4 MDS (Maximum Distance Separable) matrix defined over an extension field $GF(2^{n/4})$ that allows optimal diffusion mappings [ODM] as highly branched diffusion mappings and that performs non-linear transformation processing of n-bit input and output.

Input n bits are divided into units of n/4 bits, and the divided units are input to the bijective S-box [$S_0$] 401, S-box [$S_1$] 402, S-box [$S_2$] 403, and S-box [$S_3$] 404 each with n/4-bit input and output and are subjected to non-linear transformation processing in the respective S-boxes. Then, the resulting bits are input to the linear transformation processing part 421 constituted by the 4×4 MDS matrix defined over the extension field $GF(2^{n/4})$, and are subjected to linear transformation processing based on the MDS matrix. Then, the units of n/4 bits of the n bits as linear transformation results are input to the S-box [$S_0$] 405, S-box [$S_1$] 406, S-box [$S_2$] 407, and S-box [$S_3$] 408 each with n/4-bit input and output, and are subjected to non-linear transformation processing in the respective S-boxes. Accordingly, a structure to obtain n bits as an output result is provided.

The diffusion mappings used in the linear transformation processing part 421 shown in FIG. 18 are also implemented by an MDS matrix allowing optimal diffusion mappings [ODM], and it is ensured that the outputs of the four small S-boxes in the previous stage are arranged in good balance at the inputs of the small S-boxes in the subsequent stage. Thus, a large S-box, as a whole, with an excellent characteristic can be generated.

The structure of a data transformation apparatus constituted by S-boxes performing non-linear transformation processing according to the present invention described above will be summarized. The data transformation apparatus according to the present invention is characterized by having the structure described below. That is, the structure includes:

a first non-linear transformation part constituted by a plurality of small non-linear transformation parts (small S-boxes) performing non-linear transformation processing on individual divided data units into which input data is divided;

a linear transformation part that receives all the outputs from the plurality of small non-linear transformation parts constituting the first non-linear transformation part and that performs linear transformation; and a second non-linear transformation part constituted by a plurality of small non-linear transformation parts (small S-boxes) performing non-linear transformation processing on individual divided data units into which output data from the linear transformation part is divided, wherein the linear transformation part is configured to perform data transformation using an operation of a matrix having elements whose size is equal to the bit size of the input data, and when the matrix is an m×m matrix, is configured to perform data transformation processing using a highly branched matrix having a number of branches at least not less than m.

Specifically, when the input data is n-bit data, the first non-linear transformation part is constituted by k small non-linear transformation parts each receiving n/k bits, which form divided data units into which the n-bit input data is divided, and outputting n/k bits as a non-linear transformation processing result; the linear transformation part is configured to receive data of a total of n bits output from the k small non-linear transformation parts and to generate an n-bit output by the data transformation processing using the highly branched matrix; and the second non-linear transformation part is configured to include k small non-linear transformation parts each receiving n/k bits, which form divided data units into which the n-bit data output from the linear transformation part is divided, and outputting n/k bits as a non-linear transformation processing result.

Here, the linear transformation part is configured to perform data transformation processing using an MDS (Maximum Distance Separable) matrix for performing diffusion mappings with the number of branches equal to or more than m, for example, optimal diffusion mappings [ODM]. More specifically, the linear transformation part is configured to, when the input data is n-bit data, perform data transformation processing using a matrix over an extension field GF($2^n$) defined by an nth-order irreducible polynomial p(x) defined over GF(2)

Note that the data transformation apparatus according to the present invention can be implemented as an apparatus that performs the common-key blockcipher processing described above. For example, (a) SPN (Substitution Permutation Network) structure
(b) Feistel structure
(c) extended Feistel structure The data transformation apparatus can be used in a non-linear transformation part in an apparatus that performs encryption processing using the above-described structures. Note that the features of the present invention are applicable to an arithmetic unit that performs non-linear transformation, such as hash function, as well as encryption processing.

[4. Structural Example of Encryption Processing Apparatus]

Figure 19:
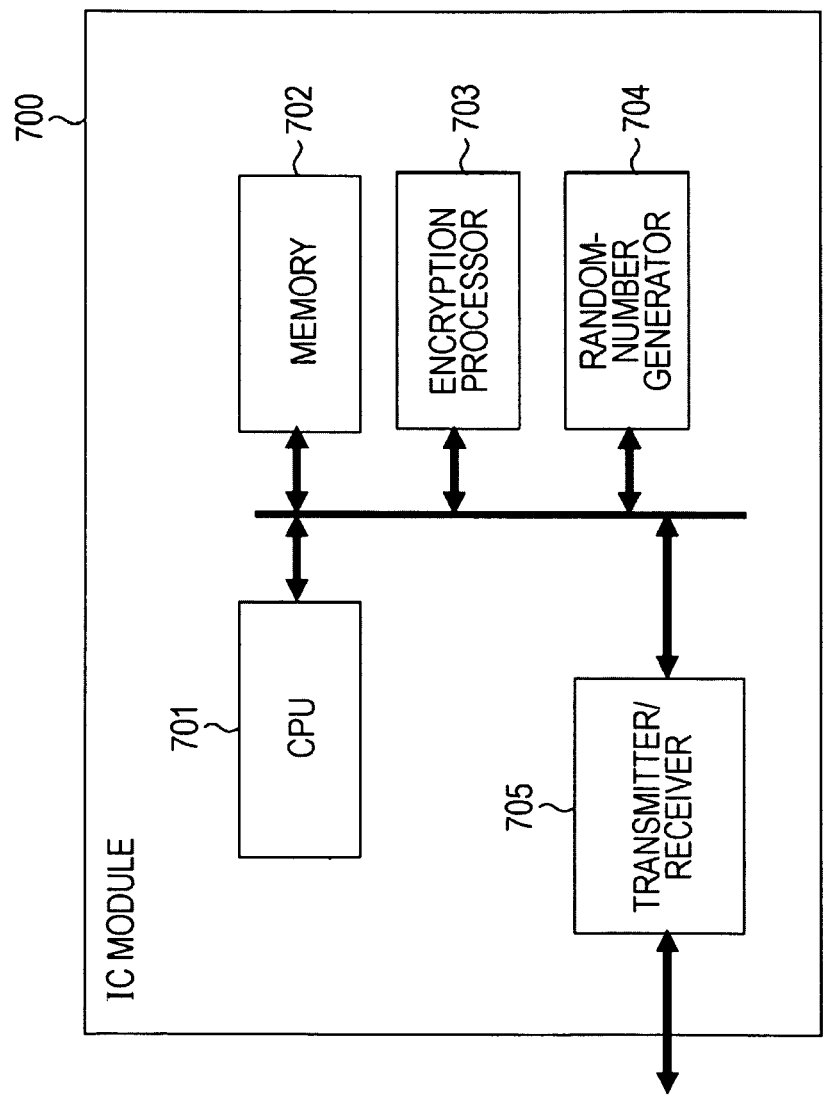
FIG. 19 is an illustration showing an example of the structure of an encryption processing apparatus as an example of an apparatus according to the present invention.

Finally, an example of the structure of an IC module 700 serving as an encryption processing apparatus is shown in FIG. 19 as an example of an apparatus that performs data transformation processing according to the above-described embodiments. The processing described above can be executed, for example, by a PC, an IC card, a reader/writer, or any other information processing apparatus, and the IC module 700 shown in FIG. 19 can be incorporated in such various apparatuses.

A CPU (Central Processing Unit) 701 shown in FIG. 19 is a processor for starting and ending encryption processing, controlling transmission and reception of data, controlling data transfer between individual element parts, and executing other various programs. A memory 702 is constituted by a ROM (Read-Only-Memory) for storing the programs executed by the CPU 701, fixed data such as calculation parameters, and the like, a RAM (Random Access Memory) used as a storage area or a work area for the programs executed in the processing of the CPU 701 and parameters changed as necessary in the program processing, and the like. In addition, the memory 702 can be used as a storage area for key data necessary for encryption processing, a transformation table (permutation table) used in the encryption processing, data used in a transformation matrix, and the like. Note that it is desirable that the data storage area be configured to be a memory having a tamper-resistant structure.

An encryption processor 703 performs encryption processing and decryption processing, and moreover, arithmetic processing using a hash function and the like according to a common-key blockcipher algorithm having, for example, any of the above-described encryption processing structures, that is, any of the structures listed below.

(a) SPN (Substitution Permutation Network) structure
(b) Feistel structure
(c) extended Feistel structure In addition, as a structure to perform non-linear transformation processing according to the above-described embodiments, that is, the structure of S-boxes with n-bit input and output, the encryption processor 703 is configured to perform non-linear transformation using small S-boxes performing non-linear transformation of input and output bits smaller than n, to input the results to a highly branched diffusion mapping matrix such as an MDS matrix to perform matrix-based transformation, and to further perform non-linear transformation on the results of transformation by using small S-boxes performing non-linear transformation of input and output bits smaller than n to obtain an n-bit result of non-linear transformation.

Note that although an example in which encryption processing means is provided as a separate module is illustrated, such an independent encryption processing module is not necessarily provided. For example, an encryption processing program may be stored in the ROM, and the CPU 701 may be configured to read the program stored in the ROM and execute the read program.

A random-number generator 704 performs generation processing for random numbers to be necessary for generation of keys or the like to be necessary in the encryption processing.

A transmitter/receiver 705 is a data communication processor that performs data communication with an external apparatus. For example, the transmitter/receiver 705 performs data communication with an IC module such as, for example, a reader/writer and outputs ciphertext generated in the IC module or inputs data from an apparatus such as an external reader/writer.

The IC module 700 is configured to perform processing using S-boxes as the non-linear transformation processing parts according to the above-described embodiments, that is, non-linear transformation processing using S-boxes having the structure described above with reference to FIGS. 13 to 18.

As described above, the present invention has been explained in detail with reference to specific embodiments thereof. However, it is obvious that modifications or alterations can be made to the embodiments by persons skilled in the art without departing from the scope of the present invention. That is, the present invention has been disclosed by way of exemplary embodiments, and should not be construed in a limited manner. The scope of the present invention should be determined with reference to the appended claims.

Note that the series of processes described in this specification can be implemented by hardware or software, or a combination thereof. When the series of processes is implemented by software, a program having a processing sequence may be installed into an internal memory of a computer incorporated in dedicated hardware and executed, or may be installed onto a general-purpose computer capable of executing various types of processing and executed.

For example, the program can be recorded in advance on a recording medium such as a hard disk or a ROM (Read Only Memory). Alternatively, the program can be temporarily or persistently stored (recorded) in a removable recording medium such as a flexible disk, a CD-ROM (Compact Disc Read Only Memory), an MO (Magneto Optical) disk, a DVD (Digital Versatile Disc), a magnetic disk, or a semiconductor memory. Such removable recording media can be provided as so-called packaged software.

Note that the program can be installed onto a computer from the above-described removable recording medium, or wirelessly transferred to the computer from a download site or transferred via wire to the computer via a network such as a LAN (Local Area Network) or the Internet, so that the computer can receive the program transferred in the manner described above and can install the program into a recording medium such as an internal hard disk.

Note that various types of processing described in this specification are not necessarily performed in a time series manner as described and may be performed in parallel or individually according to the performance of the apparatus that performs the processing or according to need. In addition, the system referred to in this specification represents a structure of a logical set of a plurality of apparatuses, and the apparatuses having individual configurations are not necessarily contained in a single housing.

INDUSTRIAL APPLICABILITY

As described above, according to the structure of an embodiment of the present invention, non-linear transformation processing performed in processing such as, for example, common-key blockcipher processing or hash function is configured such that data transformation is performed using a first non-linear transformation part performing non-linear transformation using a plurality of small S-boxes; a linear transformation part receiving all the outputs from the first non-linear transformation part, and performing linear transformation; and a second non-linear transformation part constituted by a plurality of small non-linear transformation parts performing non-linear transformation processing on individual divided data units into which output data from the linear transformation part is divided. The linear transformation part is configured to perform data transformation using a matrix for performing optimal diffusion mappings. Thus, appropriate data diffusion can be achieved without excessively increasing a critical path extending from the data input to the output, and high-security data transformation with high resistance to various cryptanalytic attacks can be achieved.

The invention claimed is:

1. A cryptographic processing apparatus for performing an extended Feistel type common key blockcipher encrypting process, comprising:
a processor, configured for:
dividing a plain text data into a first plurality of data units, which are adjusted so that the number of bits of each of the first plurality of data units is equal to the number of bits of a round key input to an F-function, wherein the first plurality of data units includes more than two data units; and
performing a plurality of rounds of processing to execute the F-function, wherein each round of processing includes:
inputting the round key into at least one of the first plurality of data units to generate a first data unit;
performing a non-linear transformation processing on the first data unit to generate a second data unit; and
performing a linear transformation on the second data unit and performing a logic operation on a result of the linear transformation and another one of the first plurality of data units;
wherein the non-linear transformation processing includes:
dividing the first data unit into a second plurality of data units; and
performing a plurality of small non-linear transformation processings on the second plurality of data units; wherein at least one of the plurality of small non-linear transformation processings includes:
performing a first non-linear transformation processing on at least one of the second plurality of data units;
performing a first linear transformation on an output of the first non-linear transformation processing;
dividing output data from the first linear transformation into a third plurality of data units; and
performing a second non-linear transformation processing on the third plurality of data units.

2. The cryptographic processing apparatus according to claim 1, wherein:
when an input data to the at least one small non-linear transformation processing is n-bit data,
the first non-linear transformation processing comprises k small non-linear transformations each receiving n/k bits, and outputting n/k bits; and the linear transformation receives data of a total of n bits output from the k small non-linear transformations and generates an n-bit output using a highly branched matrix; and the second non-linear transformation processing comprises k small non-linear transformations each receiving n/k bits divided from the n-bit output generated by the linear transformation.

3. The cryptographic processing apparatus according to claim 1, wherein the linear transformation includes data transformation processing using an MDS (Maximum Distance Separable) matrix for performing ODM (Optimal Diffusion Mappings) processing.

4. The cryptographic processing apparatus according to claim 1, wherein when an input data to the at least one small non-linear transformation processing is n-bit data, the linear transformation includes data transformation processing using a matrix over an extension field $GF(2^n)$ defined by an nth-order irreducible polynomial $p(x)$ defined over $GF(2)$.

5. The cryptographic processing apparatus according to claim 2, wherein:

the cryptographic processing apparatus comprises an S-box for performing non-linear transformation processing of n-bit input and output; and the k small non-linear transformations included in the first non-linear transformation processing and in the second non-linear transformation processing comprise an S-box having a number of bits smaller than n bits and performing non-linear transformation processing.

6. A cryptographic processing method for performing an extended Feistel type common key blockcipher encrypting process, the cryptographic processing method comprising:

dividing a plain text data into a first plurality of data units, which are adjusted so that the number of bits of each of the first plurality of data unit is equal to the number of bits of a round key input to an F-function, wherein the first plurality of data units includes more than two data units; and performing a plurality of rounds of processing to execute the F-function, wherein each round of processing includes:

inputting the round key into at least one of the first plurality of data units to generate a first data unit;

performing a non-linear transformation processing on the first data unit to generate a second data unit; and performing a linear transformation on the second data unit and performing a logic operation on a result of the linear transformation and another one of the first plurality of data units;

wherein the non-linear transformation processing includes:

dividing the first data unit into a second plurality of data units; and performing a plurality of small non-linear transformation processings on the second plurality of data units; wherein at least one of the plurality of small non-linear transformation processings includes:

performing a first non-linear transformation processing on at least one of the second plurality of data units;

performing a first linear transformation on an output of the first non-linear transformation processing;

diving output data from the first linear transformation into a third plurality of data units; and performing a second non-linear transformation processing on the third plurality of data units.

7. A non-transitory computer readable medium for causing a cryptographic processing apparatus to perform an extended Feistel type common key blockcipher encrypting process, the extended Feistel type common key blockcipher encrypting process comprising:

dividing a plain text data into a first plurality of data units, which are adjusted so that the number of bits of each of the plurality of data units is equal to the number of bits of a round key input to an F-function, wherein the first plurality of data units includes more than two data units; and performing a plurality of rounds of processing to execute the F-function, wherein each round of processing includes:

inputting the round key into at least one of the first plurality of data units to generate a first data unit;

performing a non-linear transformation processing on the first data unit to generate a second data unit; and performing a linear transformation on the second data unit and performing a logic operation on a result of the linear transformation and another one of the first plurality of data units;

wherein the non-linear transformation processing includes:

dividing the first data unit into a second plurality of data units; and performing a plurality of small non-linear transformation processings on the second plurality of data units; wherein at least one of the plurality of small non-linear transformation processings includes:

performing a first non-linear transformation processing on at least one of the second plurality of data units;

performing a first linear transformation on an output of the first non-linear transformation processing;

diving output data from the first linear transformation into a third plurality of data units; and performing a second non-linear transformation processing on the third plurality of data units.

8. The cryptographic processing apparatus according to claim 1, wherein performing the linear transformation comprises:

using a matrix operation having elements whose size is equal to the bit size of at least one of the second plurality of data units; and when the matrix is an m×m matrix, using a highly branched matrix having a number of branches at least not less than m.

* * * * *